United States Patent
Shimizu

(10) Patent No.: US 7,349,159 B2
(45) Date of Patent: Mar. 25, 2008

(54) MOLD FOR MANUFACTURING A MICROLENS SUBSTRATE, A METHOD OF MANUFACTURING MICROLENS SUBSTRATE, A MICROLENS SUBSTRATE, A TRANSMISSION SCREEN, AND A REAR PROJECTION

(75) Inventor: Nobuo Shimizu, Suwa (JP)

(73) Assignee: Seiko Epson Corporation (JP)

( * ) Notice: Subject to any disclaimer, the term of this patent is extended or adjusted under 35 U.S.C. 154(b) by 155 days.

(21) Appl. No.: 11/253,261

(22) Filed: Oct. 18, 2005

(65) Prior Publication Data
US 2006/0087741 A1    Apr. 27, 2006

(30) Foreign Application Priority Data
Oct. 21, 2004    (JP)    ............... 2004-307460

(51) Int. Cl.
    *G02B 27/10*    (2006.01)
(52) U.S. Cl. .................................... 359/619
(58) Field of Classification Search ............... 359/619, 359/453; 264/2.5
    See application file for complete search history.

(56) References Cited

U.S. PATENT DOCUMENTS

| | | | |
|---|---|---|---|
| 6,788,460 B2 * | 9/2004 | Knox et al. ................. | 359/456 |
| 6,877,975 B2 * | 4/2005 | Wuchinich ............... | 425/174.2 |
| 2003/0038999 A1 * | 2/2003 | Knox et al. ................... | 359/15 |
| 2004/0075897 A1 * | 4/2004 | Ookawa et al. ............. | 359/455 |
| 2004/0188875 A1 * | 9/2004 | Knox et al. .................. | 264/2.5 |

FOREIGN PATENT DOCUMENTS

| | | |
|---|---|---|
| JP | 04-134306 | 5/1992 |
| JP | 10-093060 | 4/1998 |
| JP | 2000-131506 | 5/2000 |
| JP | 2002-214414 | 7/2002 |
| JP | 2002-222604 | 8/2002 |
| JP | 2003-80598 | 3/2003 |
| JP | 2003-279949 | 10/2003 |
| JP | 2004-287373 | 10/2004 |
| JP | 2005-178052 | 7/2005 |
| JP | 3731592 | 10/2005 |
| KR | 2003-0039642 | 5/2003 |
| KR | 2003-0088307 | 11/2003 |

OTHER PUBLICATIONS

Communication from Japanese Patent Office regarding corresponding application.
Communication from Japanese Patent Office re: related application.
Communication from Korean Patent Office regarding counterpart application.

* cited by examiner

*Primary Examiner*—Hung Dang
*Assistant Examiner*—Vipin M Patel
(74) *Attorney, Agent, or Firm*—Harness, Dickey & Pierce, P.L.C.

(57) ABSTRACT

A mold 6 for manufacturing a microlens substrate 1 is disclosed. The microlens substrate is provided with a plurality of microlenses each having a predetermined convex shape. The mold is used to press a base material of the microlens substrate to form the plurality of microlenses thereon. The mold 6 has a roll shape having an outer peripheral surface, and a plurality of concave portions 61 each having a predetermined shape corresponding to the convex shape of each microlens are provided on the outer peripheral surface of the mold 6 for pressing the base material of the microlens substrate. In this case, the plurality of concave portions 61 are formed by means of an etching process with a mask.

10 Claims, 12 Drawing Sheets

MOLD FOR MANUFACTURING A MICROLENS SUBSTRATE, A METHOD OF MANUFACTURING MICROLENS SUBSTRATE, A MICROLENS SUBSTRATE, A TRANSMISSION SCREEN, AND A REAR PROJECTION

CROSS-REFERENCE TO RELATED APPLICATION

This application claims priority to Japanese Patent Application No. 2004-307460 filed Oct. 21, 2004, which is hereby expressly incorporated by reference herein in its entirety.

FIELD OF THE INVENTION

The present invention relates to a mold for manufacturing a microlens substrate, a method of manufacturing microlens substrate, a microlens substrate, a transmission screen, and a rear projection.

BACKGROUND OF THE INVENTION

In recent years, demand for a rear projection is becoming increasingly strong as a suitable display for a monitor for a home theater, a large screen television, or the like. In a transmission screen used for the rear projector, lenticular lenses are in general use. However, a conventional rear projection provided with such lenticular lenses has a problem that the vertical angle of view thereof is small although the lateral angle of view thereof is large (this is, there is a bias in the angles of view).

In order to solve such a problem, an attempt to use a microlens sheet on which a plurality of microlenses are formed so that concave portions or convex portions have optically rotational symmetry has been proposed (for example, see JP-A-2000-131506). The microlens sheet (microlens substrate) as described above has been conventionally manufactured using a so-called 2P method. In the 2P method, a uncured resin is supplied onto a substrate provided with a plurality of concave portions for forming a plurality of microlenses, the supplied resin is pressed and made to adhere closely to the substrate with concave portions by bringing a flat and transparent substrate contact with the resin, and then the resin is cured (for example, see JP-A-2003-279949).

However, in the 2P method as described above, there is a problem that it is difficult to release the cured resin from the substrate with concave portions. Further, such a problem becomes further remarkable in the case where the microlens substrate to be manufactured has a large area. For this reason, there is a possibility that yields become extremely low when manufacturing a large-sized microlens substrate.

Further, in the case where a microlens substrate to be manufactured is one having a large size (for example, a substrate having a diagonal length thereof of 140 cm or more), the problem as described above becomes more remarkable. In addition, the size of the substrate with concave portions used to manufacture a microlens substrate becomes larger, and therefore, there is a problem that the manufacturing facility for the microlens substrate becomes larger further. Moreover, along with rapid size-up of a monitor for a home cheater, a display or the like in recent years, it is required that the substrate with concave portions corresponding to the monitor or the like gets larger, whereby it is necessary to manufacture various types (sizes) of substrates with concave portions corresponding to various sizes of monitor or the like. As a result, a problem that price reduction of a microlens substrate is prevented for this reason happens.

SUMMARY OF THE INVENTION

It is one object of the invention to provide a mold for manufacturing a microlens substrate with which the microlens substrate can be manufactured with high productivity, and which is suitably used to manufacture the microlens substrate with high productivity.

It is another object of the invention to provide a microlens substrate and a method of manufacturing a microlens substrate in which defects such as a crack of a microlens can be prevented efficiently.

Further, it is yet another object of the invention to provide a transmission screen and a rear projection with the microlens substrate described above.

In order to achieve the above objects, in one aspect of the invention, the invention is directed to a mold for manufacturing a microlens substrate provided with a plurality of microlenses each having a predetermined convex shape. The mold is used to press a base material of the microlens substrate to form the plurality of microlenses thereon. In this case, the mold has a roll shape having an outer peripheral surface, and a plurality of concave portions each having a predetermined shape corresponding to the convex shape of each microlens are provided on the outer peripheral surface of the mold for pressing the base material of the microlens substrate, and the plurality of concave portions are formed by means of an etching process with a mask.

This makes it possible to provide a mold for manufacturing a microlens substrate which can be appropriately used to manufacture a microlens substrate with high productivity.

In the mold of the invention, it is preferable that the mask has a laminated structure constructed from a layer formed of chromium as a main material and a layer formed of chromium oxide as a main material.

Thus, when manufacturing the mold for manufacturing a microlens substrate, it is possible to form a plurality of openings for forming concave portions each having a desired shape in the mask easily and surely. In addition, it is possible to improve adhesion between a base (roll-shaped base) and the mask at the etching process, in particular. Therefore, it is possible to form the plurality of concave portions each having a desired shape with which the mold for manufacturing a microlens substrate is provided easily and surely, and as a result, it is possible to form the microlenses each having a desired shape with which the microlens substrate is provided easily and surely.

In the mold of the invention, it is preferable that each of the plurality of concave portions has a substantially elliptic shape.

Thus, the microlens substrate manufactured using the mold for manufacturing a microlens substrate hardly generates disadvantage such as moire, in particular, and it is possible to improve the angle of view characteristics of a transmission screen provided with the microlens substrate thus manufactured.

In the mold of the invention, it is preferable that the length of each of the plurality of concave portions in a long axis direction thereof is in the range of 15 to 750 μm.

This makes it possible to prevent disadvantage such as moire from being generated in an image projected to a screen of a transmission screen provided with the microlens substrate manufactured using the mold for manufacturing a microlens substrate, and it is possible to obtain sufficient screen resolution in the projected image. In addition, it is possible to improve the productivity of the microlens substrate.

In the mold of the invention, it is preferable that the length of each of the plurality of concave portions in a short axis direction thereof is in the range of 10 to 500 μm.

This makes it possible to prevent disadvantage such as moire from being generated in an image projected to a screen of a transmission screen provided with the microlens substrate manufactured using the mold for manufacturing a microlens substrate, and it is possible to obtain sufficient screen resolution in the projected image. In addition, it is possible to improve the productivity of the microlens substrate.

In the mold of the invention, it is preferable that the depth of each of the plurality of concave portions is in the range of 5 to 250 μm.

This makes it possible to improve the angle of view characteristics of a transmission screen provided with the microlens substrate manufactured using the mold for manufacturing a microlens substrate, and it is possible to prevent defects in the shape of each of the microlenses from being generated when manufacturing the microlens substrate more efficiently.

In the mold of the invention, it is preferable that the mold is manufactured from a roll-shaped base having an axis of rotation, and the etching process is carried out while the roll-shaped base onto which the mask has been applied is rotated around the axis of rotation thereof.

This makes it possible to reduce variety in the shape of each of the concave portions, in particular, and it is possible to improve the characteristics of the microlens substrate to be manufactured particularly.

In another aspect of the invention, the invention is directed to a method of manufacturing a microlens substrate provided with a plurality of microlenses each having a convex predetermined shape. In this case, the microlens substrate is manufactured using the mold for manufacturing a microlens substrate of the invention.

This makes it possible to manufacture the microlens substrate with high productivity. In particular, it is possible to manufacture the microlens substrate with high productivity while preventing defects such as a crack of each of the microlenses from being generated effectively.

In the method of manufacturing a microlens substrate according to the invention, it is preferable that the method includes the steps of:

preparing a base material constituted from a resin material as a main material;

preparing the mold for manufacturing a microlens substrate of the invention; and pressing the base material with the mold while heating the mold and mutually moving the mold with respect to the base material to transfer the shape of the outer peripheral surface of the mold onto the surface of the base material.

This makes it possible to manufacture the microlens substrate with high productivity. In particular, it is possible to manufacture the microlens substrate with high productivity while preventing defects such as a crack of each of the microlenses from being generated effectively.

In the method of manufacturing a microlens substrate according to the invention, it is preferable that the method includes the steps of:

preparing a substrate having a plate-like shape or a sheet-like shape, the substrate having two major surfaces;

preparing the mold for manufacturing a microlens substrate defined by claim 1; and pressing a resin material having fluidity with the mold while supplying the resin material onto one major surface of the substrate as a base material and mutually moving the mold with respect to the substrate to transfer the shape of the outer peripheral surface of the mold onto the resin material.

This makes it possible to manufacture the microlens substrate with high productivity. In particular, it is possible to manufacture the microlens substrate with high productivity while preventing defects such as a crack of each of the microlenses from being generated effectively.

In the method of manufacturing a microlens substrate according to the invention, it is preferable that the temperature of the mold when pressing the base material or the resin material is higher than a glass transition point of the resin material.

This makes it possible to transfer the shape of the outer peripheral surface of the mold onto the base material or the resin material.

In still another aspect of the invention, the invention is directed to a microlens substrate manufactured using the mold for manufacturing a microlens substrate according to the invention.

This makes it possible to provide a microlens substrate in which defects such as a crack of each of the microlenses are prevented from being generated efficiently.

In yet another aspect of the invention, the invention is directed to a microlens substrate manufactured using the manufacturing method of the invention.

This makes it possible to provide a microlens substrate in which defects such as a crack of each of the microlenses are prevented from being generated efficiently.

In still another aspect of the invention, the invention is directed to a transmission screen. The transmission screen of the invention includes:

a Fresnel lens formed with a plurality of concentric prisms on one major surface thereof, the one major surface of the. Fresnel lens constituting an emission surface thereof; and the microlens substrate of the invention, the microlens substrate being arranged on the side of the emission surface of the Fresnel lens so that the one major surface thereof faces the Fresnel lens.

This makes it possible to provide a transmission screen that can display an excellent image stably.

In yet still another aspect of the invention, the invention is directed to a rear projection. The rear projection of the invention includes the transmission screen defined as described above.

This makes it possible to provide a rear projection that can display an excellent image stably.

BRIEF DESCRIPTION OF THE DRAWINGS

The foregoing and other objects, features and advantages of the invention will become more readily apparent from the following detailed description of preferred embodiments of the invention which proceeds with reference to the appending drawings.

DETAILED DESCRIPTION OF THE INVENTION

Preferred embodiments of a mold for manufacturing a microlens substrate, a method of manufacturing microlens substrate, a microlens substrate, a transmission screen, and a rear projection according to the invention will now be described in detail with reference to the appending drawings.

In this regard, in the invention, a "substrate" indicates a concept that includes one having a relatively large wall thickness and substantially no flexibility, sheet-shaped one, film-shaped one, and the like. Further, although application of the microlens substrate and the like of the invention is not particularly limited, in the present embodiment, a description will be given for the case where the microlens substrate is used as convex lens substrate included in a transmission screen or a rear projection.

First, the configuration of a microlens substrate of the invention will be described prior to the description of a mold for manufacturing a microlens substrate, a method of manufacturing microlens substrate using the mold for manufacturing a microlens substrate, a transmission screen, and a rear projection.

Figure 1:
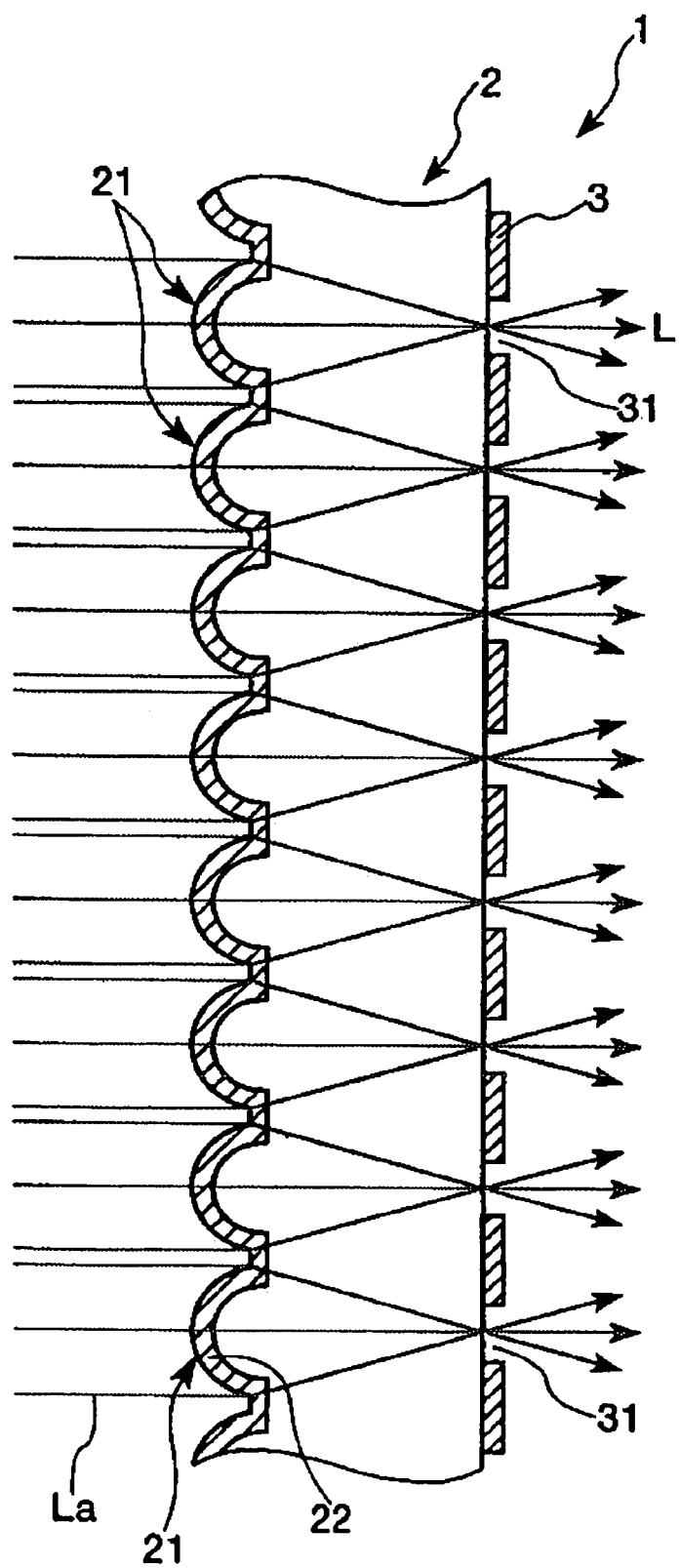
FIG. 1 is a longitudinal cross-sectional view which schematically shows a microlens substrate in a preferred embodiment according to the invention.
Figure 2:
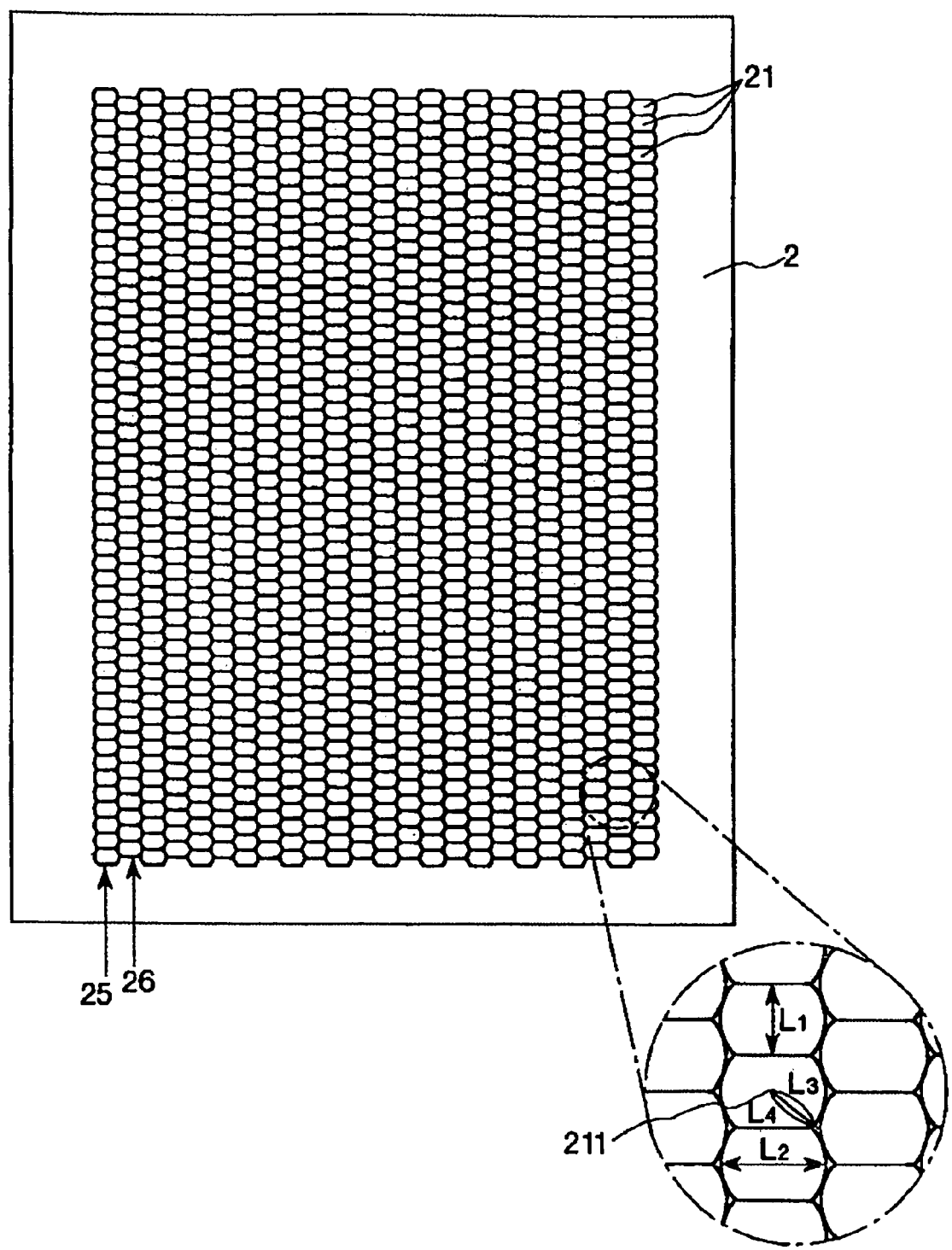
FIG. 2 is a plan view of the microlens substrate shown in FIG. 1.

FIG. 1 is a longitudinal cross-sectional view which schematically shows a microlens substrate 1 in a preferred embodiment according to the invention. FIG. 2 is a plan view of the microlens substrate 1 shown in FIG. 1. Now, in the following explanation using FIG. 1, for convenience of explanation, a left side and a right side in FIG. 1 are referred to as a "light incident side (or light incident surface)" and a "light emission side (or light emission surface)", respectively. In this regard, in the following description, a "light incident side" and a "light emission side" respectively indicate a "light incident side" and a "light emission side" of light for obtaining an image light, and they do not respectively indicate a "light incident side" and a "light emission side" of outside light or the like if not otherwise specified.

The microlens substrate 1 is a member that is included in a transmission screen 10 described later. As shown in FIG. 1, the microlens substrate 1 includes: a main substrate 2 provided with a plurality of microlenses 21 in a predetermined pattern at one major surface thereof (light incident surface); and a black matrix (light shielding layer) 3 formed of a material having light shielding effect at the other major surface thereof (light emission surface). Further, the microlens substrate 1 is provided with a coloring portion (outside light absorbing portion) 22 at the light incident surface thereof (that is, the light incident side of each of the microlenses 21).

The main substrate 2 is generally constituted from a material having transparent. The constituent material of the main substrate 2 is not particularly limited, but the main substrate 2 is composed of a resin material as a main material. The resin material is a transparent material having a predetermined index of refraction.

As for the concrete constituent material of the main substrate 2, for example, polyolefin such as polyethylene, polypropylene, ethylene-propylene copolymer, ethylene-vinyl acetate copolymer (EVA) and the like, cyclic polyolefin, denatured polyolefin, polyvinyl chloride, polyvinylidene chloride, polystyrene, polyamide (such as nylon 6, nylon 46, nylon 66, nylon 610, nylon 612, nylon 11, nylon 12, nylon 6-12, nylon 6-66), polyimide, polyamide-imide, polycarbonate (PC), poly-(4-methylpentene-1), ionomer, acrylic resin, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyester such as polyethylene terephthalate (PET), polybutylene terephthalate (PBT), and polycyclohexane terephthalate (PCT), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, liquid crystal polymer such as aromatic polyester, fluoro resins such as polytetrafluoroethylene (PTFE), polyfluorovinylidene and the like, various thermoplastic elastomers such as styrene based elastomer, polyolefin based elastomer, polyvinylchloride based elastomer, polyurethane based elastomer, polyester based elastomer, polyamide based elastomer, polybutadiene based elastomer, trans-polyisoprene based elastomer, fluorocarbon rubber based elastomer, chlorinated polyethylene based elastomer and the like, epoxy resins, phenolic resins, urea resins, melamine resins, unsaturated polyester, silicone based resins, urethane based resins, and the like; and copolymers, blended bodies and polymer alloys and the like having at least one of these materials as a main ingredient may be mentioned. Further, in this invention, a mixture of two or more kinds of these materials may be utilized (for example, a blended resin, a polymer alloy, a laminate body comprised of two or more layers using two or more of the materials mentioned above).

The resin material constituting the main substrate 2 normally has an absolute index of refraction more than each of those of various gases (that is, atmosphere at which the microlens substrate 1 is used). It is preferable that the concrete absolute index of refraction of the resin material is in the range of 1.2 to 1.9. More preferably it is in the range of 1.35 to 1.75, and further more preferably it is in the range of 1.45 to 1.60. In the case where the absolute index of refraction of the resin material has a predetermined value within the above range, it is possible to further improve the angle of view characteristics of a transmission screen 10 provided with the microlens substrate 1 while keeping the light use efficiency of the transmission screen 10.

The microlens substrate 1 is provided with the plurality of microlenses 21 each having a convex surface as a convex lens on the side of the light incident surface thereof from which the light is allowed to enter the microlens substrate 1. In the present embodiment, each of the microlenses 21 has a substantially elliptic shape (a flat shape or a substantial bale shape) in which a longitudinal width thereof is larger than a lateral width when viewed from above the light incident surface of the microlens substrate 1. In the case where each of the microlenses 21 has such a shape, it is possible to particularly improve the angle of view characteristics of the transmission screen 10 provided with the microlens substrate 1 while preventing disadvantage such as moiré from being generated efficiently. In particular, in this case, it is possible to improve the angle of view characteristics in both the horizontal and vertical directions of the transmission screen 10 provided with the microlens substrate 1.

In the case where the length (or pitch) of each of the microlenses 21 in a short axis (or minor axis) direction thereof is defined as $L_1$ (μm) and the length (or pitch) of each of the microlenses 21 in a long axis (or major axis) direction thereof is defined as $L_2$ (μm) when viewed from above the light incident surface of the microlens substrate 1, it is preferable that the ratio of $L_1/L_2$ is in the range of 0.10 to 0.99. More preferably it is in the range of 0.50 to 0.95, and further more preferably it is in the range of 0.60 to 0.80. By restricting the ratio of $L_1/L_2$ within the above range, the effect described above can become apparent.

It is preferable that the length $L_1$ of each of the microlenses 21 in the minor axis direction thereof when viewed from above the light incident surface of the microlens substrate 1 is in the range of 10 to 500 μm. More preferably it is in the range of 30 to 300 μm, and further more preferably it is in the range of 50 to 100 μm. In the case where the length of each of the microlenses 21 in the minor axis direction thereof is restricted within the above range, it is possible to obtain sufficient resolution in the image projected on the transmission screen 10 and further enhance the productivity of the microlens substrate 1 (including the transmission screen 10) while preventing disadvantage such as moiré from being generated efficiently.

Further, it is preferable that the length $L_2$ of each of the microlenses 21 in the major axis direction thereof when viewed from above the light incident surface of the microlens substrate 1 is in the range of 15 to 750 μm. More preferably it is in the range of 45 to 450 μm, and further more preferably it is in the range of 75 to 150 μm. In the case where the length of each of the microlenses 21 in the major axis direction thereof is restricted within the above range, it is possible to obtain sufficient resolution in the image projected on the transmission screen 10 and further enhance the productivity of the microlens substrate 1 (including the transmission screen 10) while preventing disadvantage such as moiré from being generated efficiently.

Moreover, it is preferable that the radius of curvature of each of the microlenses 21 in the minor axis direction thereof (hereinafter, referred to simply as "radius of curvature of the microlens 21" is in the range of 5 to 150 μm. More preferably it is in the range of 15 to 150 μm, and further more preferably it is in the range of 25 to 50 μm. By restricting the radius of curvature of the microlens 21 within the above range, it is possible to improve the angle of view characteristics of the transmission screen 10 provided with the microlens substrate 1. In particular, in this case, it is possible to improve the angle of view characteristics in both the horizontal and vertical directions of the transmission screen 10 provided with the microlens substrate 1.

Furthermore, it is preferable that the height of each of the microlenses 21 is in the range of 5 to 250 μm. More preferably it is in the range of 15 to 150 μm, and further more preferably it is in the range of 25 to 100 μm. In the case where the height of each of the microlenses 21 is restricted within the above range, it is possible to improve the angle of view characteristics particularly while preventing moire due to interfere of light from being generated effectively.

Further, in the case where the height of each of the microlenses 21 is defined as H (μm) and the length of the microlenses 21 in a short axis (or minor axis) direction thereof is defined as $L_1$ (μm), then H and $L_1$ satisfy the relation: $0.90 \leq L_1/H \leq 2.5$. More preferably H and $L_1$ satisfy the relation: $1.0 \leq L_1/H \leq 1.8$, and further more preferably H and $L_1$ satisfy the relation: $1.2 \leq L_1/H \leq 1.6$. In the case where H and $L_1$ satisfy such a relation, it is possible to improve the angle of view characteristics particularly while preventing moire due to interfere of light from being generated effectively.

Further, the plurality of microlenses 21 are arranged on the main substrate 2 in a houndstooth check manner. By arranging the plurality of microlenses 21 in this way, it is possible to prevent disadvantage such as moire from being generated effectively. On the other hand, for example, in the case where the microlenses 21 are arranged on the main substrate 2 in a square lattice manner or the like, it is difficult to prevent disadvantage such as moire from being generated sufficiently. Further, in the case where the microlenses 21 are arranged on the main substrate 2 in a random manner, it is difficult to improve the share of the microlenses 21 in a usable area in which the microlenses 21 are formed sufficiently, and it is difficult to improve light transmission into the microlens substrate 1 (light use efficiency) sufficiently. In addition, the obtained image becomes dark.

Although the microlenses 21 are arranged on the main substrate 2 in a houndstooth check manner when viewed from above one major surface of the microlens substrate 1 as described above, it is preferable that a first column 25 constituted from a plurality of microlenses 21 is shifted by a half pitch with respect to a second column 26 adjacent to the first column 25. This makes it possible to improve the angle of view characteristics particularly while preventing moire due to interfere of light from being generated effectively.

As described above, by specifying the shape of the microlens 21, the arrangement pattern of the microlenses 21, share of the microlenses 21, and the like strictly, it is possible to improve the angle of view characteristics particularly while preventing the moire due to interfere of light from being generated effectively.

Furthermore, each of the microlenses 21 is formed as a convex lens which protrudes toward the light incident side thereof, and is designed so that the focal point f thereof is positioned in the vicinity of each of openings 31 provided on the black matrix (light shielding layer) 3. In other words, parallel light La that enters the microlens substrate 1 from a direction substantially perpendicular to the microlens substrate 1 (parallel light La from a Fresnel lens 5 described later) is condensed by each of the microlenses 21 of the microlens substrate 1, and is focused on the focal point f in the vicinity of each of openings 31 provided on the black matrix (light shielding layer) 3. In this way, since the light patting through each of the microlenses 21 focuses in the vicinity of each of the openings 31 of the black matrix 3, it is possible to enhance the light use efficiency of the microlens substrate 1 particularly. Further, since the light patting through each of the microlenses 21 focuses in the vicinity of each of the openings 31, it is possible to reduce the area of each of the openings 31.

Further, it is preferable that the ratio of an area (projected area) occupied by all the microlenses 21 in a usable area where the microlenses 21 are formed with respect to the entire usable area is 90% or more when viewed from above the light incident surface of the microlens substrate 1 (that is, a direction shown in FIG. 2). More preferably the ratio is 96% or more, further more preferably the ratio is in the range of 97 to 99.5%. In the case where the ratio of the area occupied by all the microlenses (convex lenses) 21 in the usable area with respect to the entire usable area is 90% or more, it is possible to reduce straight light passing through an area other than the area where the microlenses 21 reside, and this makes it possible to enhance the light use efficiency of the transmission screen 10 provided with the microlens substrate 1 further. In this regard, in the case where the length of one microlens 21 in a direction from the center of the one microlens 21 to the center of a non-formed area on which the four adjacent microlenses 2 including the one microlens 2 are not formed is defined as $L_3$ (µm) and the length between the center of the one microlens 21 and the center of the non-formed area is defined as $L_4$ (µm) when viewed from above the light incident surface of the microlens substrate 1, the ratio of an area (projected area) occupied by all the microlenses 21 in a usable area where the microlenses 21 are formed with respect to the entire usable area can be approximated by the ratio of the length of the line segment $L_3$ (µm) to the length of the line segment $L_4$ (µm) (that is, $L_3/L_4 \times 100$ (%)) (see FIG. 2).

Further, as described above, the colored portion 22 is provided on the light incident surface of the microlens substrate 1 (that is, on the light incident side of each of the microlenses 21). The light entering the microlens substrate 1 from the light incident surface thereof can penetrate such a colored portion 22 efficiently, and the colored portion 22 has a function of preventing outside light from being reflected to the light emission side of the microlens substrate 1. By providing such a colored portion 22, it is possible to obtain a projected image having excellent contrast.

In particular, in the invention, the colored portion 22 is one that is formed by supplying a coloring liquid (particularly, a coloring liquid having a special feature of composition) onto the main substrate 2 (will be described later). To explain this special feature in detail, the colored portion 22 is one that is formed by supplying a coloring liquid (will be described later) onto the main substrate 2 so that a coloring agent in the coloring liquid impregnates the inside of the main substrate 2 (microlenses 21). In the case where the colored portion 22 is formed in this way, it is possible to heighten adhesion of the colored portion 22 compared with the case where the colored portion 22 is laminated on the outer peripheral surface of the main substrate 2. As a result, for example, it is possible to prevent a harmful influence due to change in the index of refraction in the vicinity of the interface between the colored portion 22 and the main substrate 2 on the optical characteristics of the microlens substrate from being generated more surely.

Further, since the colored portion 22 is formed by supplying the coloring liquid onto the main substrate 2, it is possible to reduce variation in the thickness of the respective portions (in particular, the variation in the thickness that does not correspond to the surface shape of the main substrate 2). This makes it possible to prevent disadvantage such as color heterogeneity from being generated in the projected image. Moreover, although the colored portion 22 is constituted from a material containing a coloring agent, the main component thereof is generally the same as the main component of the main substrate 2 (microlens substrate 1). Therefore, a rapid change in the index of refraction or the like is hardly generated in the vicinity of the boundary between the colored portion 22 and the other non-colored portion. As a result, it is easy to design the optical characteristics of the microlens substrate 1 as a whole, and it is possible to stabilize the optical characteristics of the microlens substrate 1 and to heighten the reliability thereof.

The color density of the colored layer 22 is not particularly limited. It is preferable that the color density of the colored layer 22 indicated by Y value (D65/2° angle of view) on the basis of spectral transmittance is in the range of 20 to 85%. More preferably it is in the range of 35 to 70%. In the case where the concentration of the coloring agent in the colored portion 22 is restricted within the above ranges, it is possible to improve the contract of the image formed by the light penetrating the microlens substrate 1 particularly. On the other hand, in the case where the color density of the colored portion 22 is below the lower limit given above, the light transmission of the incident light is lowered and the obtained image cannot have sufficient brightness. As a result, there is a possibility that the contrast of the image becomes insufficient. Further, in the case where the color density of the colored portion 22 is over the upper limit given above, it is difficult to prevent the outside light (that is, outside light entering the microlens substrate 1 from the side opposite to the light incident side) from being reflected sufficiently, and since the increasing amount of front side luminance of black indication (black luminance) becomes large when a light source is fully turned off at a bright room, there is a possibility that the effect to improve the contrast of the projected image cannot be obtained sufficiently.

The color of the colored portion 22 is not particularly limited. It is preferable that the color of the colored portion 22 is an achromatic color, particularly black as appearance using a coloring agent in which the color thereof is based on blue and red, brown or yellow is mixed therein. Further, it is preferable that light having specific wavelengths for controlling balance of light's three primary colors (RGB) of a light source is selectively absorbed in the colored portion 22 or penetrates the colored portion 22. This makes it possible to prevent the outside light from being reflected. The tone of color of the image formed from the light penetrating the microlens substrate 1 can be expressed exactly, and chromatic coordinate is widened (the width of expression of the tone of color is made to widen sufficiently), and therefore a darker black can be expressed. As a result, it is possible to improve the contrast of the image, in particular.

Moreover, the black matrix 3 is provided on the light emission surface of the microlens substrate 1. In this case, the black matrix 3 is constituted from a material having a light shielding effect and formed in a laminated manner. By providing such a black matrix 3, it is possible to absorb outside light (which is not preferable to from a projected image) in the black matrix 3, and therefore it is possible to improve the image projected on a screen which has excellent contrast. In particular, by providing both the colored portion 22 as described above and the black matrix 3, it is possible to enhance the contrast of the image projected by the microlens substrate 1. Such a black matrix 3 is provided with a plurality of openings 31 on light path of the light penetrating each of the microlenses 21. Thus, the light condensed by each of the microlenses 21 can pass through the openings 31 of the black matrix 3 efficiently. As a result, it is possible to heighten the light use efficiency of the microlens substrate 1.

Further, it is preferable that the average thickness of the black matrix 3 is in the range of 0.01 to 5 μm. More preferably it is in the range of 0.01 to 3 μm, and further more preferably it is in the range of 0.03 to 1 μm. In the case where the average thickness of the black matrix 3 is restricted within the above ranges, it is possible to fulfill the function of the black matrix 3 more efficiently while preventing involuntary disadvantage such as separation and crack of the black matrix 3 more surely. For example, it is possible to improve the contrast of the image projected to a screen of a transmission screen 10 provided with the microlens substrate 1.

Next, a transmission screen 10 provided with the microlens substrate 1 as described above will now be described.

Figure 3:
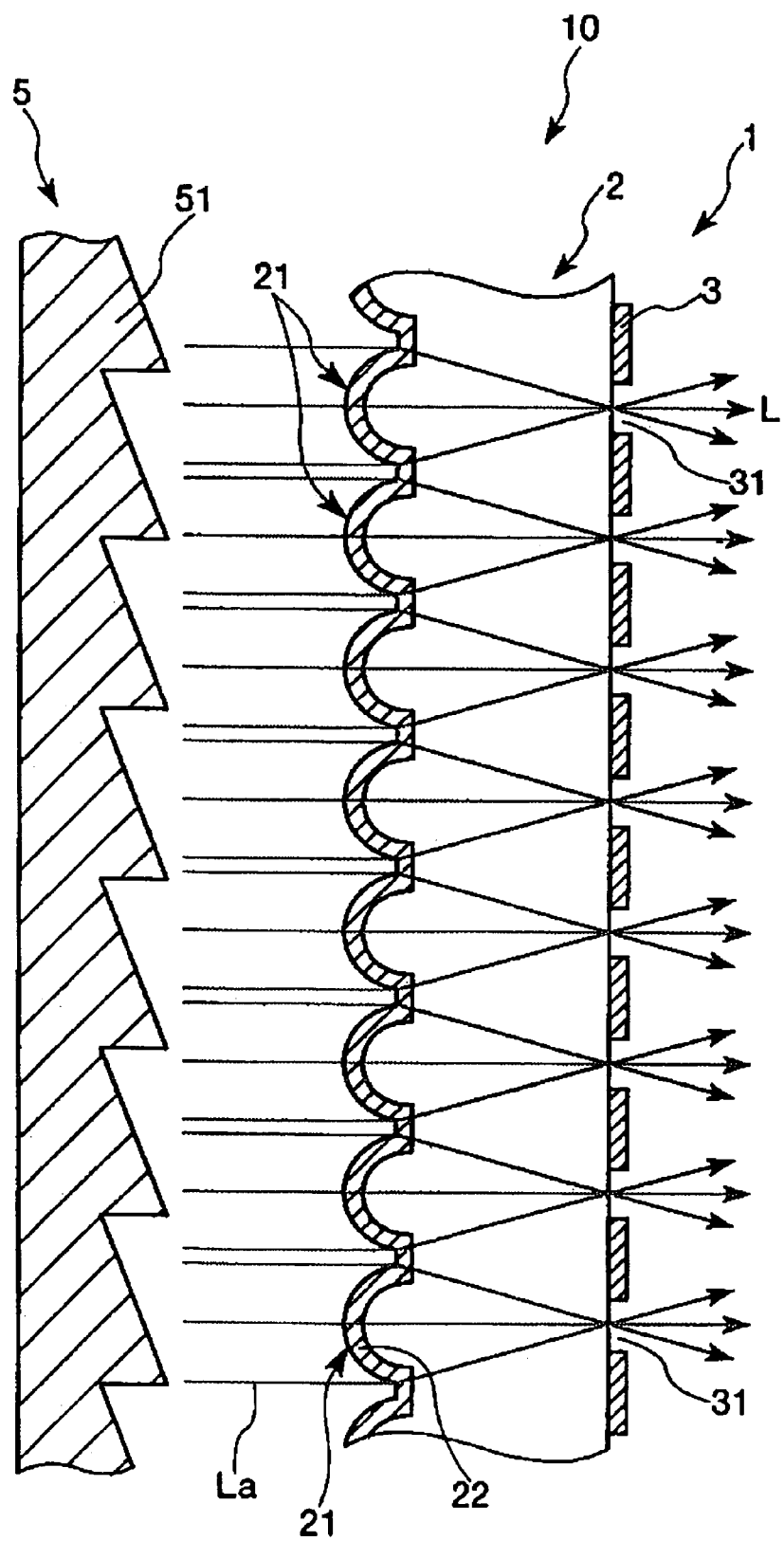
FIG. 3 is a longitudinal cross-sectional view which schematically shows a transmission screen provided with the microlens substrate shown in FIG. 1 in a preferred embodiment according to the invention.

FIG. 3 is a longitudinal cross-sectional view which schematically shows a transmission screen 10 provided with the microlens substrate 1 shown in FIG. 1 in a preferred embodiment according to the invention. As shown in FIG. 3, the transmission screen 10 is provided with a Fresnel lens 5 and the microlens substrate 1 described above. The Fresnel lens 5 is arranged on the side of the light incident surface of the microlens substrate 1 (that is, on the incident side of light for an image), and the transmission screen 10 is constructed so that the light that has been transmitted by the Fresnel lens 5 enters the microlens substrate 1.

The Fresnel lens 5 is provided with a plurality of prisms that are formed on a light emission surface of the Fresnel lens 5 in a substantially concentric manner. The Fresnel lens 5 deflects the light for a projected image from a projection lens (not shown in the drawings), and outputs parallel light La that is parallel to the perpendicular direction of the major surface of the microlens substrate 1 to the side of the light incident surface of the microlens substrate 1.

In the transmission screen 10 constructed as described above, the light from the projection lens is deflected by the Fresnel lens 5 to become the parallel light La. Then, the parallel light La enters the microlens substrate 1 from the light incident surface on which the plurality of microlenses 21 are formed to be condensed by each of the microlenses 21 of the microlens substrate 1, and the condensed light then is focused and passes, through the openings 31 of the black matrix (light shielding layer) 3. At this time, the light entering the microlens substrate 1 penetrates through the microlens substrate 1 with sufficient transmittance and the light penetrating the openings 31 is then diffused, whereby an observer (viewer) of the transmission screen 10 observes (watches) the as a flat image.

Next, a description will now be given for a mold for manufacturing the microlens substrate of the invention which can be used suitably to manufacture the microlens substrate as described above and a method of manufacturing the same.

Figure 4:
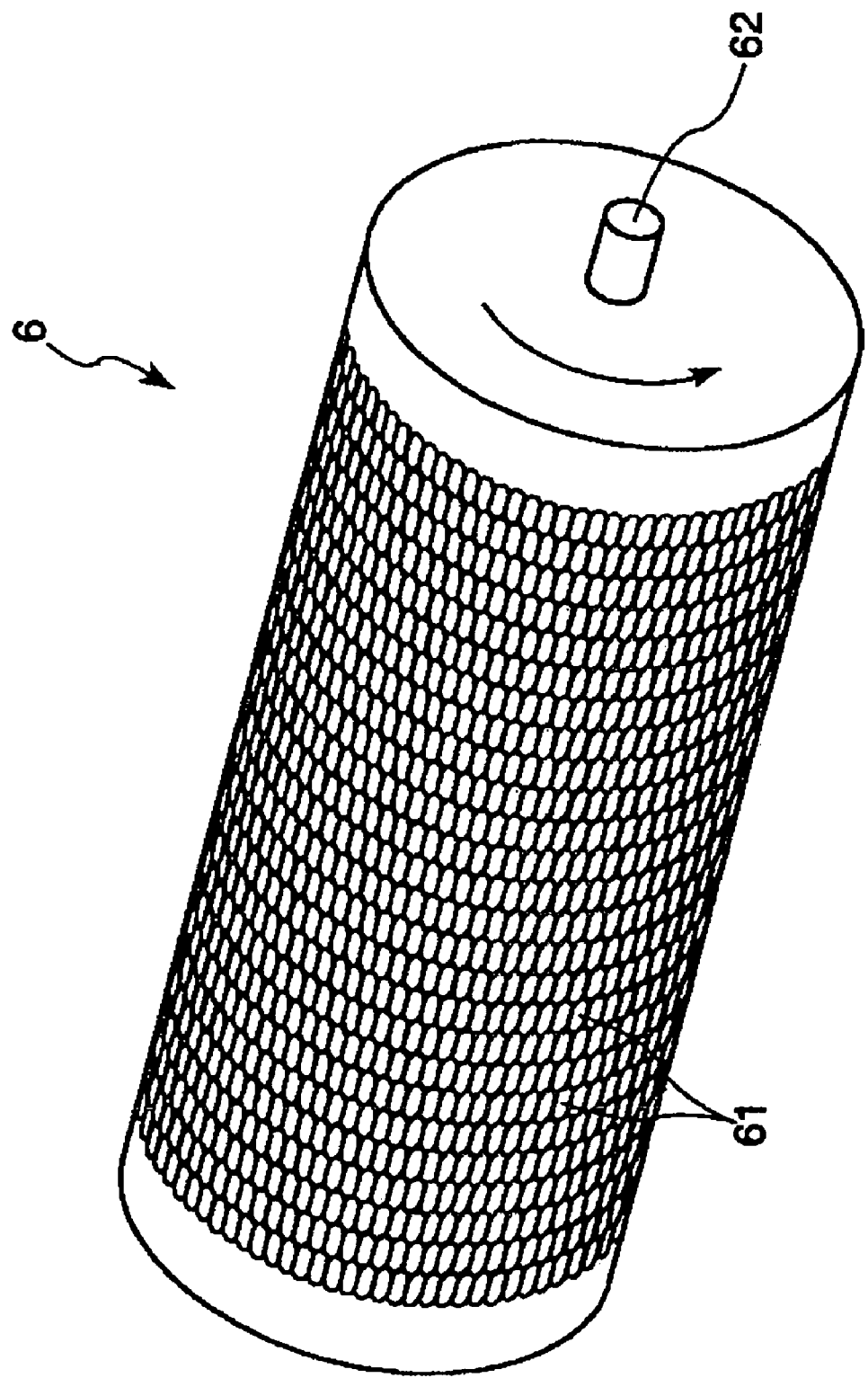
FIG. 4 is a perspective view which schematically shows a mold for manufacturing a microlens substrate according to the invention.
Figure 5:
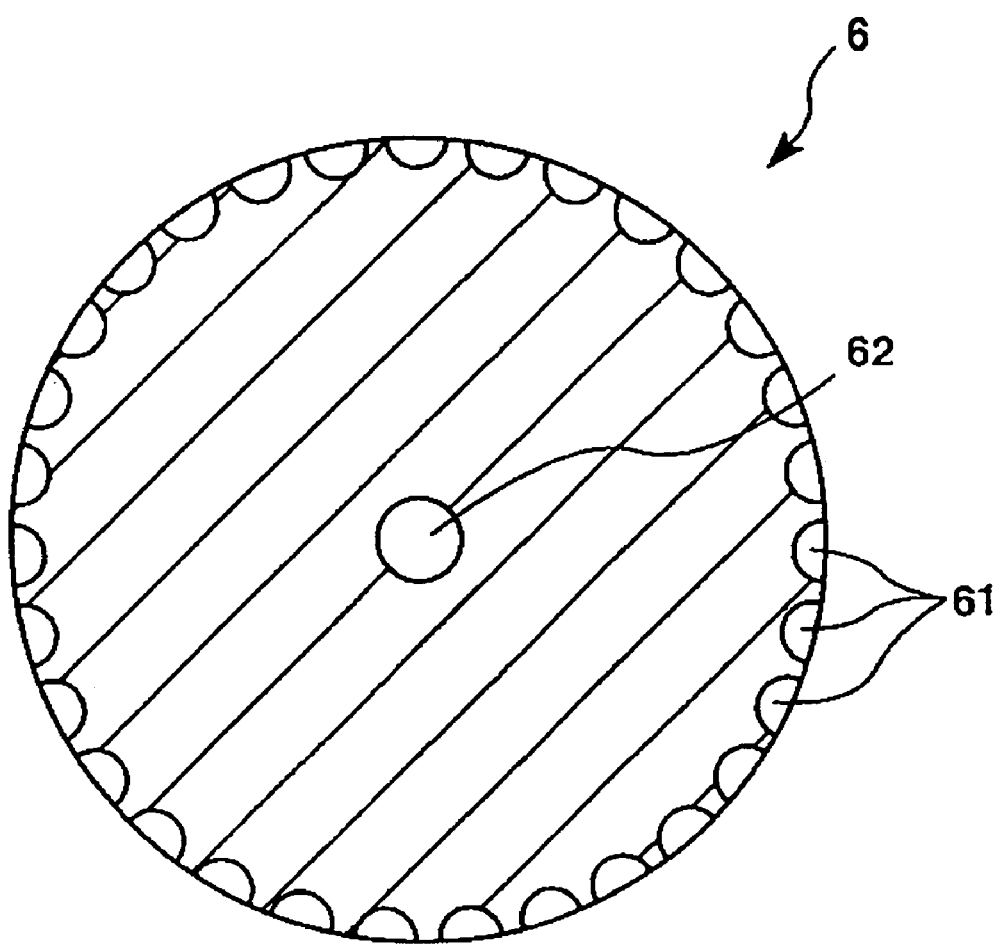
FIG. 5 is a longitudinal cross-sectional view which schematically shows the mold for manufacturing a microlens substrate shown in FIG. 4.

FIG. 4 is a perspective view which schematically shows a mold 6 for manufacturing a microlens substrate 1 according to the invention. FIG. 5 is a longitudinal cross-sectional view which schematically shows the mold 6 for manufacturing a microlens substrate 1 shown in FIG. 4. FIG. 6 is a longitudinal cross-sectional view which schematically shows a method of manufacturing the mold 6 for manufacturing a microlens substrate 1 shown in FIGS. 4 and 5. In this regard, although a plurality of concave portions for forming microlenses 21 are actually formed on an outer peripheral surface of a roll-shaped base to manufacture the mold 6 for manufacturing a microlens substrate 1 in manufacturing the mold 6 for manufacturing a microlens substrate 1, in order to make the explanation understandable, a part of the mold 6 for manufacturing a microlens substrate 1 is shown so as to be emphasized in FIGS. 4 to 6.

As shown in FIG. 4, the mold 6 for manufacturing a microlens substrate 1 has a roll shape, and is provided with a plurality of concave portions 61 on the outer peripheral surface thereof. Each of the plurality of concave portions 61 has a shape corresponding to that of each of the microlenses 21 constituting the microlens substrate 1 described above, and the plurality of concave portions 61 are arranged in a pattern corresponding to the arrangement pattern of the microlenses 21. In other words, each of the concave portions 61 generally has substantially the same size of each of the microlenses 21 (the same except that each of the microlenses 21 is a convex portion, while each of the concave portions 61 is a concave portion, and that one has a shape and a positional relation to which the other is transferred), and the concave portions 61 has the same arrangement pattern as the microlenses 21.

To explain it in detail, in the present embodiment, each of the concave portions (concave portions for forming microlenses 21) 61 has a substantially elliptic shape (or a flat shape, a substantial bale shape) in which the perpendicular length is larger than the lateral width when viewed from above the outer peripheral surface of the mold 6 for manufacturing a microlens substrate 1. Since each of the concave portions 61 has such a shape, it is possible to appropriately utilize the manufacture of the microlens substrate 1 which can improve the angle of view characteristics particularly while preventing disadvantage such as moire from being generated efficiently.

Further, in the case where the length (or pitch) of each of the concave portions 61 in a short axis (or minor axis) direction thereof is defined as $L_1$ (μm) and the length (or pitch) of each of the concave portions 61 in a long axis (or major axis) direction thereof is defined as $L_2$ (μm) when viewed from above the outer peripheral surface of the mold 6 for manufacturing a microlens substrate 1, it is preferable that the ratio of $L_1/L_2$ is in the range of 0.10 to 0.99. More preferably it is in the range of 0.50 to 0.95, and further more preferably it is in the range of 0.60 to 0.80. By restricting the ratio of $L_1/L_2$ within the above range, the effect described above can become apparent.

Moreover, it is preferable that the length $L_1$ of each of the concave portions 61 in the minor axis direction thereof when viewed from above the outer peripheral surface of the mold 6 for manufacturing a microlens substrate 1 is in the range of 10 to 500 μm. More preferably it is in the range of 30 to 300 μm, and further more preferably it is in the range of 50 to 100 μm. In the case where the length of each of the concave portions 61 in the minor axis direction thereof is restricted within the above range, it is possible to obtain sufficient resolution in the image projected on the transmission screen 10 and further enhance the productivity of the microlens substrate 1 (and the mold 6 for manufacturing a microlens substrate 1) while preventing disadvantage such as moire from being generated efficiently.

Furthermore, it is preferable that the length $L_2$ of each of the concave portions 61 in the major axis direction thereof when viewed from above the outer peripheral surface of the mold 6 for manufacturing a microlens substrate 1 is in the range of 15 to 750 μm. More preferably it is in the range of 45 to 450 μm, and further more preferably it is in the range of 75 to 150 μm. In the case where the length of each of the concave portions 61 in the major axis direction thereof is restricted within the above range, it is possible to obtain sufficient resolution in the image projected on the transmission screen 10 and further enhance the productivity of the microlens substrate 1 (and the mold 6 for manufacturing a microlens substrate 1) while preventing disadvantage such as moiré from being generated efficiently.

Further, it is preferable that the radius of curvature of each of the concave portions 61 in the minor axis direction thereof (hereinafter, referred to simply as "radius of curvature of the concave portion 61" is in the range of 5 to 150 μm. More preferably it is in the range of 15 to 150 μm, and further more preferably it is in the range of 25 to 50 μm. By restricting the radius of curvature of the concave portions 61 within the above range, it is possible to improve the angle of view characteristics of the transmission screen 10 provided with the microlens substrate 1. In particular, in this case, it is possible to improve the angle of view characteristics in both the horizontal and vertical directions of the transmission screen 10 provided with the microlens substrate 1.

Moreover, it is preferable that the depth of each of the concave portions 61 is in the range of 5 to 250 μm. More preferably it is in the range of 15 to 150 μm, and further more preferably it is in the range of 25 to 100 μm. In the case where the depth of each of the concave portions 61 is restricted within the above range, it is possible to improve the angle of view characteristics particularly while preventing moire due to interfere of light from being generated effectively.

Furthermore, in the case where the depth of each of the concave portions 61 is defined as D (μm) and the length of the concave portions 61 in a short axis (or minor axis) direction thereof is defined as $L_1$ (μm), then D and $L_1$ satisfy the relation: $0.90 \leq L_1/D \leq 2.5$. More preferably D and $L_1$ satisfy the relation: $1.0 \leq L_1/D \leq 1.8$, and further more preferably D and $L_1$ satisfy the relation: $1.2 \leq L_1/D \leq 1.6$. In the case where D and $L_1$ satisfy such a relation, it is possible to improve the angle of view characteristics particularly while preventing moire due to interfere of light from being generated effectively.

Further, the plurality of concave portions 61 are arranged on the outer peripheral surface of the mold 6 for manufacturing a microlens substrate 1 in a houndstooth check manner. By arranging the plurality of concave portions 61 in this way, it is possible to prevent disadvantage such as moire from being generated effectively. On the other hand, for example, in the case where the concave portions 61 are arranged on the outer peripheral surface of the mold 6 for manufacturing a microlens substrate 1 in a square lattice manner or the like, it is difficult to prevent disadvantage such as moire from being generated sufficiently. Further, in the case where the concave portions 61 are arranged on the outer peripheral surface of the mold 6 for manufacturing a microlens substrate 1 in a random manner, it is difficult to improve the share of the concave portions 61 in a usable area in which the concave portions 61 are formed sufficiently, and it is difficult to improve light transmission into the microlens substrate (light use efficiency) sufficiently. In addition, the obtained image becomes dark.

Moreover, in the invention, the long axis direction of each of the concave portions 61 is substantially the same as an axis direction of the mold 6 for manufacturing a microlens substrate 1. Thus, in a method of manufacturing a microlens substrate 1 as will be described later, it is possible to prevent defects from being generated in each of microlenses 21 to be formed more surely when a resin material to become the main substrate 2 (a resin material in which the surface shape of the mold 6 for manufacturing a microlens substrate 1 is to be transferred onto one major surface thereof) is released from the mold 6 for manufacturing a microlens substrate 1. It is preferable that the angle constructed from the long axis direction of each of the concave portions 61 and the axis direction of the mold 6 for manufacturing a microlens substrate 1 is in the range of 0 to 10°. More preferably the angle is in the range of 0 to 7°, and further more preferably the angle is in the range of 0 to 5°. Thus, the effects as described above appear remarkably further.

Furthermore, although the concave portions 61 are arranged on the mold 6 for manufacturing a microlens substrate 1 in a houndstooth check manner when viewed from above the outer peripheral surface of the mold 6 for manufacturing a microlens substrate 1 as described above, it is preferable that a first array of concave portions 61 is shifted by a half pitch of each of the concave portions 61 in a short axis direction thereof with respect to a second array of concave portions 61 which is adjacent to the first array of concave portions 61 when viewed from above the outer peripheral surface of the mold 6 for manufacturing a microlens substrate 1. This makes it possible to improve the angle of view characteristics particularly while preventing moire due to interfere of light from being generated effectively.

In this regard, in the above explanation, it has been described that each of the concave portions 61 has substantially the same shape (size) as that of each of the microlenses 21 with which the microlens substrate 1 is provided, and the concave portions 61 have substantially the same arrangement pattern as that of the microlenses 21. However, for example, in the case where the constituent material of the main substrate 2 of the microlens substrate 1 tends to contract easily (that is, in the case where the resin material constituting the main substrate 2 is contracted by means of solidification or the like), the shape (and size), share or the like with respect to each of the microlenses 21 with which the microlens substrate 1 is provided an the concave portions 61 with which the mold 6 for manufacturing a microlens substrate 1 is provided may be different from each other in view of the percentage of contraction or the like.

Further, the plurality of concave portions 61 may be arranged in a spiral manner around the axis 62 of the mold 6 for manufacturing a microlens substrate 1 on the outer peripheral surface thereof. In the case where the concave portions 61 are arranged in such a manner, it is possible to form the microlenses 21 having the arrangement pattern as described above, when manufacturing the microlens substrate 1. Further, in the case where the plurality of concave portions 61 are arranged in a spiral manner, it is possible to form initial holes (openings) 81 for forming concave portions each having a desired shape in a mask 8 easily and surely at an initial hole formation process (will be described later) when manufacturing the mold 6 for manufacturing a microlens substrate 1, and it is possible to improve the adhesion between the base material 7 for the mold 6 and the mask particularly. Therefore, it is possible to form the concave portions 61 each having a desired shape with which the mold 6 for manufacturing a microlens substrate 1 is provided easily and surely, and as a result, it is possible to form the microlenses 21 each having a desired shape on the microlens substrate 1 easily and surely.

The mold 6 for manufacturing a microlens substrate 1 may be formed of any material. However, it is preferable that an outer peripheral portion of the mold 6 for manufacturing a microlens substrate 1 is formed of, for example, any one of various kinds of metal materials such as Fe, Cu, Al, Ni, Cr, Zn, Sn, Ag, Au, Pb, Mg, Ti, $ZrO_2$ (zirconia), W, Mo, Co, metal stainless steel, 42%-Ni—Fe alloy, brass and duralumin, and various kinds of glass such as soda-lime glass, crystalline glass, quartz glass, lead glass, potassium glass, borosilicate glass, and alkali-free glass. In the case where the outer peripheral portion of the mold 6 for manufacturing a microlens substrate 1 is formed of any one material as described above, it is possible to transfer the shape and the arrangement pattern of the concave portions 61 with which the mold 6 for manufacturing a microlens substrate 1 is provided more accurately, and it is possible to improve the endurance of the mold 6 for manufacturing a microlens substrate 1. Further, in the case where the outer peripheral portion of the mold 6 for manufacturing a microlens substrate 1 is formed of any one material as described above, it is possible to form the concave portions 61 each having a desired shape and an arrangement pattern easily and surely when manufacturing the mold 6 for manufacturing a microlens substrate 1.

Further, the mold 6 for manufacturing a microlens substrate 1 may include, for example, a heater (heating unit) (not shown in the drawings) therein. Thus, it is possible to form the microlenses 21 each having a desired shape in a desired arrangement pattern using a method as described later more easily.

Next, the method of manufacturing the mold 6 for manufacturing microlens substrate 1 according to the invention will be described with reference to FIG. 6.

First, a roll-shaped base material 7 is prepared in manufacturing the mold 6 for manufacturing a microlens substrate 1.

It is preferable that a base material having a substantially column shape or substantially cylinder shape is used for the base material 7. Further, it is also preferable that a base material with a surface cleaned by washing or the like is used for the base material 7.

Although soda-lime glass, crystalline glass, quartz glass, lead glass, potassium glass, borosilicate glass, alkali-free glass and the like may be mentioned as for a constituent material for the base material 7, soda-lime glass and crystalline glass (for example, neoceram or the like) are preferable among them. By the use of soda-lime glass, crystalline glass or alkali-free glass, it is easy to process the material for the base material 7, and it is advantageous from the viewpoint of a manufacturing cost of the mold 6 for manufacturing a microlens substrate 1 because soda-lime glass or crystalline glass is relatively inexpensive.

Figure 6A:
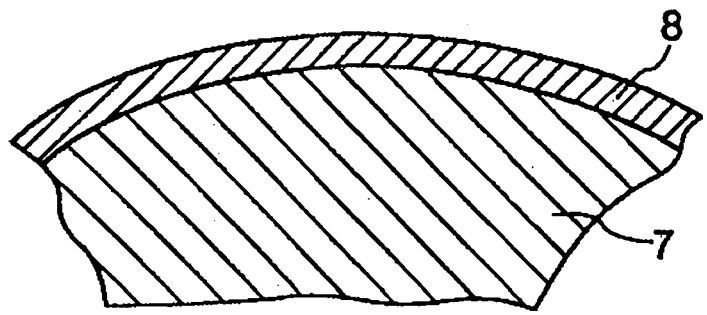
FIG. 6 is a longitudinal cross-sectional view which schematically shows a method of manufacturing the mold for manufacturing a microlens substrate shown in FIGS. 4 and 5.

<A1> As shown in FIG. 6A, a mask 8 is formed on the surface of the prepared base material 7 (mask formation process).

The constituent material of the mask 8 is not particularly limited, for example, metals such as Cr, Au, Ni, Ti, Pt, and the like, metal alloys containing two or more kinds of metals selected from these metals, oxides of these metals (metal oxides), silicon, resins, and the like may be mentioned. Further, the mask 8 may be, for example, one having a substantially even composition, or a laminated structure by a plurality of layers.

As described above, the configuration of the mask 8 is not particularly limited, and it is preferable that the mask 8 has a laminated structure constructed from a layer formed of chromium as a main material and a layer formed of chromium oxide as a main material. The mask 8 having such a structure has excellent stability with respect to various echants having various structures (that is, it is possible to protect the base material 7 more surely at an etching process (as will be described later)), and it is possible to form the openings each having a desired shape easily and surely by means of irradiation with laser beams or the like as will be described later. Further, in the case where the mask 8 has such a structure as described above, a solution containing ammonium hydrogen difluoride ($NH_4HF_2$), for example, may be appropriately used as an etchant at the etching process (described later). Since a solution containing ammonium hydrogen difluoride is not poison, it is possible to prevent its influence on human bodies during work and on the environment more surely. Moreover, the mask 8 having such a structure makes it possible to reduce internal stress of the mask 8 effectively, and such a mask 8 has excellent adhesion (that is, adhesion of the mask 8 to the base material 7 at the etching process, in particular) to the base material 7, in particular. For these reasons, by using the mask 8 having the structure described above, it is possible to form concave portions 61 each having a desired shape easily and surely.

The method of forming the mask 8 is not particularly limited. In the case where the mask 8 is constituted from any of metal materials (including metal alloys) such as Cr and Au or metal oxides such as chromium oxide, the mask 8 can be suitably formed by means of an evaporation method, a sputtering method, or the like, for example. On the other hand, in the case where the mask 8 is formed of silicon, the mask 8 can be suitably formed by means of a sputtering method, a CVD method, or the like, for example.

Although the thickness of the mask 8 also varies depending upon the material constituting the mask 8, it is preferable that the thickness of the mask 8 is in the range of 0.01 to 2.0 µm, and more preferably it is in the range of 0.03 to 0.2 µm. If the thickness of the mask 8 is below the lower limit given above, there may be a possibility to deform the shapes of the initial holes 81 formed at the initial hole formation process (or openings formation process, which will be described later) depending upon the constituent material of the mask 8 or the like. In addition, there is a possibility that sufficient protection for the masked portion of the base material 7 cannot be obtained during a wet etching process at the etching step (described later). On the other hand, if the thickness of the mask 8 is over the upper limit given above, in addition to the difficulty in formation of the initial holes 81 that penetrate the mask 8 at the initial hole formation process (described later), there will be a case in which the mask 8 tends to be easily removed due to internal stress thereof depending upon the constituent material or the like of the mask 8.

Figure 6B:
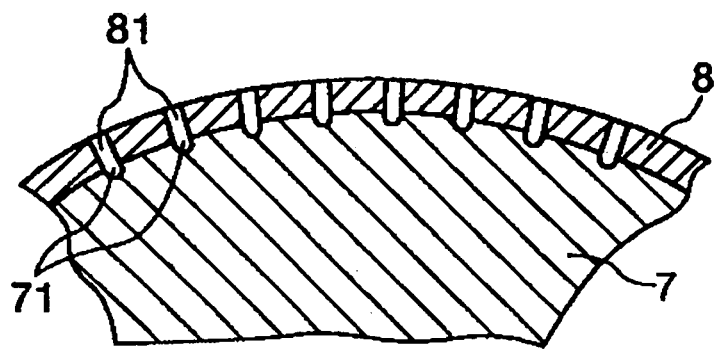

<A2> Next, as shown in FIG. 6B, the plurality of initial holes 81 that will be utilized as mask openings at the etching process (described later) are formed in the mask 8 in a random manner (initial hole formation process). The method of forming the initial holes 81 is not particularly limited, but it is preferable that the initial holes 81 are formed by the irradiation with laser beams. This makes it possible to form the initial holes 81 each having a desired shape, which are arranged in a desired pattern, easily and accurately. As a result, it is possible to control the shape of each of the concave portions 61, the arrangement pattern, or the like more surely. Further, by forming the initial holes 81 by means of the irradiation with laser, it is possible to manufacture the mold 6 for manufacturing a microlens substrate 1 at high productivity. In particular, the concave portions can be easily formed on a relatively large-sized substrate. Moreover, in the case where the initial holes 81 are formed by means of irradiation with laser beams, by controlling the irradiation conditions thereof, it is possible to form only the initial holes 81 without forming initial concave portions 71 (will be described later), or it is possible to form the initial concave portions 71 in which variation in shape, size and depth thereof is made to be small easily and surely in addition to the initial holes 81. Furthermore, by forming the initial holes 81 in the mask 8 by means of irradiation with laser beams, it is possible to form the openings (initial holes 81) in the mask 8 at a low cost easily compared with the case of forming openings in a mask by means of a conventional photolithography method. Further, in the case where the initial holes 81 are formed by means of irradiation with laser beams, it is possible to form the plurality of initial holes (openings) 81 corresponding to the plurality of concave portions 61 arranged in a spiral manner as described above efficiently. More specifically, for example, by carrying out the irradiation with laser beams intermittently while rotating the roll-shaped base material 7 around the axis (shaft) 62 thereof and scanning the laser beams in one axis direction, it is possible to form the plurality of initial holes (openings) 81 corresponding to the plurality of concave portions 61 arranged in a spiral manner as described above efficiently in the case where the initial holes 81 are formed by means of the irradiation with laser beams. As a result, it is possible to improve productivity of the mold for manufacturing a microlens substrate 1 and productivity of the microlens substrate 1.

Further, in the case where the initial holes 81 are formed by means of the irradiation with laser beams, the kind of laser beam to be used is not particularly limited, but a ruby laser, a semiconductor laser, a YAG laser, a femtosecond laser, a glass laser, a $YVO_4$ laser, a Ne—He laser, an Ar laser, a carbon dioxide laser, an excimer laser or the like may be mentioned. Moreover, a waveform of a laser such as SHG (second-harmonic generation), THG (third-harmonic generation), FHG (fourth-harmonic generation) or the like may be utilized.

When the initial holes 81 are formed in the mask 8, as shown in FIG. 6B, the initial concave portions 71 may also be formed in the base material 7 by removing parts of the surface of the base material 7 in addition to the initial holes 81. This makes it possible to increase contact area of the base material 7 with the etchant when subjecting the base material 7 with the mask 8 to the etching process (described later), whereby erosion can be started suitably. Further, by adjusting the depth of each of the initial concave portions 71, it is also possible to adjust the depth of each of the concave portions 61 (that is, the maximum thickness of the lens (microlens 21)). Although the depth of each of the initial concave portions 71 is not particularly limited, it is preferable that it is 5.0 µm or less, and more preferably it is in the range of about 0.1 to 0.5 µm. In the case where the formation of the initial holes 81 is carried out by means of the irradiation with laser beams, it is possible to surely reduce variation in the depth of each of the plurality of initial concave portions 71 formed together with the initial holes 81. This makes it possible to reduce variation in the depth of each of the concave portions 61 constituting a mold 6 for manufacturing a microlens substrate 1, and therefore it is possible to reduce variation in the size and shape of each of the microlenses 21 in the microlens substrate 1 obtained finally. As a result, it is possible to reduce variation in the diameter, the focal distance, and the thickness of the lens of each of the microlenses 21, in particular.

The shape and size of each of the initial holes 81 to be formed at the present process is not particularly limited. In the case where each of the initial holes 81 is a substantially circular shape, it is preferable that the diameter of each of the initial holes 81 is in the range of 0.8 to 20 µm. More preferably it is in the range of 1.0 to 10 µm, and further more preferably it is in the range of 1.5 to 4 µm. In the case where the diameter of each of the initial holes 81 is restricted within the above ranges, it is possible to form the concave portions 61 each having the shape as described above at an etching process (will be described later) surely. On the other hand, in the case where each of the initial holes 81 is a flat shape such as a substantially elliptic shape, it is possible to substitute the length thereof in the short axis direction for the diameter thereof. Namely, in the case where each of the initial holes 81 to be formed at the present process is the substantially elliptic shape, the width of each of the initial holes 81 (the length in the short axis direction thereof) is not particularly limited, but the width of each of the initial holes 81 is in the range of 0.8 to 20 µm. More preferably it is in the range of 1.0 to 10 µm, and further more preferably it is in the range of 1.5 to 4 µm. In the case where the width of each of the initial holes 81 is restricted within the above ranges, it is possible to form the concave portions 61 each having the shape as described above at an etching process (will be described later) surely.

Further, in the case where each of the initial holes 81 to be formed at the present process is the substantially elliptic shape, the length of each of the initial holes 81 (the length in the long axis direction thereof) is not particularly limited, but the width of each of the initial holes 81 is in the range of 0.9 to 30 µm. More preferably it is in the range of 1.5 to 15 µm, and further more preferably it is in the range of 2.0 to 6 µm. In the case where the width of each of the initial holes 81 is restricted within the above ranges, it is possible to form the concave portions 61 each having the shape as described above at an etching process (will be described later) more surely.

Further, other than by means of the irradiation with laser beams, the initial holes 81 may be formed in the formed mask 8 by, for example, previously arranging foreign objects on the base material 7 with a predetermined pattern when the mask 8 is formed on the base material 7, and then forming the mask 8 on the base material 7 with the foreign objects to form defects in the mask 8 by design so that the defects are utilized as the initial holes 81.

Figure 6C:
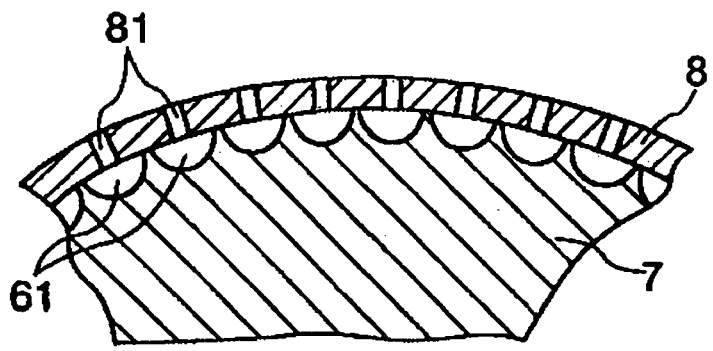

<A3> Next, as shown in FIG. 6C, a large number of concave portions 61 are formed in the base material 7 in a random manner by subjecting the base material 7 to the etching process using the mask 8 in which the initial holes 81 are formed (etching process). In this way, in the invention, the concave portions 61 are formed by means of the etching process. This makes it possible to form a mold having high productivity. Further, in the case where the concave portions 61 are formed by means of a method other than the etching method such as press, grinding, and polishing, there are problems that the manufacturing costs become high and a large number of defects appear therein, and therefore uneven molds are formed. On the other hand, in the invention, it is possible to form the concave portions 61 each having little defect and no unevenness with low manufacturing costs.

The etching method is not particularly limited, and as for the etching method, a wet etching process, a dry etching process and the like may be mentioned, for example. In the following explanation, the case of using the wet etching process will be described as an example.

By subjecting the substrate 7 covered with the mask 8 in which the initial holes 81 are formed to the wet etching process, as shown in FIG. 6C, the substrate 7 is eroded from the portions where no mask 8 is present, whereby a large number of concave portions 61 are formed in the substrate 7. As mentioned above, since the initial holes 81 formed in the mask 8 are arranged in a houndstooth check manner, the concave portions 61 to be formed are also arranged on the surface of the substrate 7 in a houndstooth check manner.

Further, in the present embodiment, the initial concave portions 71 are formed on the surface of the substrate 7 when the initial holes 81 are formed in the mask 8 at step <A2>. This makes the contact area of the substrate 7 with the etchant increase during the etching process, whereby erosion can be made to start suitably. Moreover, the concave portions 61 can be formed suitably by employing the wet etching process. In the case where an etchant containing, for example, ammonium hydrogen difluoride is utilized for an etchant, the substrate 7 can be eroded more selectively, and this makes it possible to form the concave portions 61 suitably.

In the case where the mask 8 is mainly constituted from chromium (that is, the mask 8 is formed of a material containing Cr as a main material thereof), a solution of ammonium hydrogen difluoride is particularly suited as a hydrofluoric acid-based etchant. Since a solution containing ammonium hydrogen difluoride is not poison, it is possible to prevent its influence on human bodies during work and on the environment more surely. Further, in the case where the solution of ammonium hydrogen difluoride is used as an etchant, for example, hydrogen peroxide may be contained in the etchant. This makes it possible to accelerate the etching speed.

Further, the wet etching process can be carried out with simpler equipment than that in the dry etching process, and it allows the processing for a larger number of substrates 7 at a time. This makes it possible to enhance productivity of the mold 6 for manufacturing a microlens substrate 1, and it is possible to provide the mold 6 for manufacturing a microlens substrate 1 at a lower cost.

Moreover, it is preferable that the etching process is carried out while rotating the base material 7 with the mask 8 around the axis 71. This makes it possible to reduce variation in the shape of each of the concave portions 61, and it is possible to improve the characteristics of the microlens substrate 1 to be manufactured (in particular, optical characteristics) particularly. In particular, in the case where the etching process is carried out by means of a wet etching process, the rate of progression of the etching process may vary at respective portions by differential pressure (difference f water pressure) due to difference of the depth of an etchant. However, by rotating the base material 7 as described above, it is possible to prevent such a problem from being generated efficiently.

Furthermore, in the case where the base material 7 is rotated at the etching process (including relative rotation), it is preferable that the rotational direction of the base material 7 (that is, relatively rotational direction) is changed with time. Thus, for example, it is possible to prevent uneven etching due to liquid flow of an etchant or gas flow of an etching gas from proceeding more surely. It is possible to make the shape of each of the concave portions 61 to be formed appropriate further.

Figure 6D:
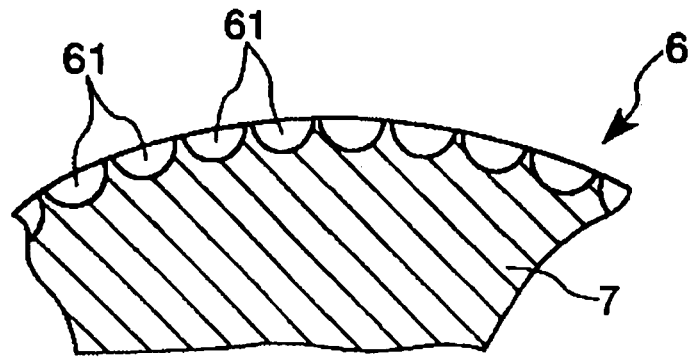

<A4> Next, the mask 8 is removed as shown in FIG. 6D (mask removal process). In the case where the mask 8 is constituted from the laminated structure constructed from the layer formed of chromium as a main material and the layer formed of chromium oxide as a main material as described above, the removal of the mask 8 can be carried out by means of an etching process using a mixture of ceric ammonium nitrate and perchloric acid, for example.

As a result of the processing in the above, as shown in FIGS. 6D and 4, a mold 6 for manufacturing a microlens substrate 1 in which a large number of concave portions 61 are formed in the roll-shaped base material 7 in a houndstooth check manner is obtained.

The method of forming the plurality of concave portions 61 on the surface of the roll-shaped base material 7 in a houndstooth check manner is not particularly limited. In the case where the concave portions 61 are formed by means of the method mentioned above, that is, the method of forming the concave portions 61 in the roll-shaped base material 7 by forming the initial holes 81 in the mask 8 by means of the irradiation with laser beams and then subjecting the substrate 7 to the etching process using the mask 8, it is possible to obtain the following effects.

Namely, by forming the initial holes 81 in the mask 8 by means of the irradiation with laser beams, it is possible to form openings (initial holes 81) in a predetermined pattern in the mask 8 easily and inexpensively compared with the case of forming the openings in the mask 8 by means of the conventional photolithography method. This makes it possible to enhance productivity of the mold 6 for manufacturing a microlens substrate 1, whereby it is possible to provide the mold 6 for manufacturing a microlens substrate 1 at a lower cost. Further, in the invention, since the mold 6 for manufacturing a microlens substrate 1 has a roll shape, it is extremely difficult to form the concave portions (that is, openings corresponding to the concave portions) in accordance with a design in the case where the openings are formed in the mask by means of the photolithography method. On the other hand, it is possible to form the concave portions (that is, openings corresponding to the concave portions) with a desired arrangement pattern each having a desired shape easily and surely in the case where the openings are formed in the mask by means of the irradiation with laser beams.

In this regard, any processing for improving mold releasing property by a mold release agent may be applied to the outer peripheral surface of the mold 6 for manufacturing a microlens substrate 1. Thus, it is possible to make the shape, arrangement and the like of the microlenses 21 of the microlens substrate 1 to be manufactured using the mold 6 for manufacturing a microlens substrate 1 appropriate further.

Next, a method of manufacturing the microlens substrate 1 using the mold 6 for manufacturing a microlens substrate 1 will now be described.

Although the microlens substrate 1 is one manufactured using the mold 6 for manufacturing a microlens substrate 1 according to the invention, in the following embodiment, the case where the microlens substrate 1 is manufactured using an apparatus for manufacturing a microlens substrate 1 provided with the mold for manufacturing a microlens substrate 1, in particular.

Figure 7:
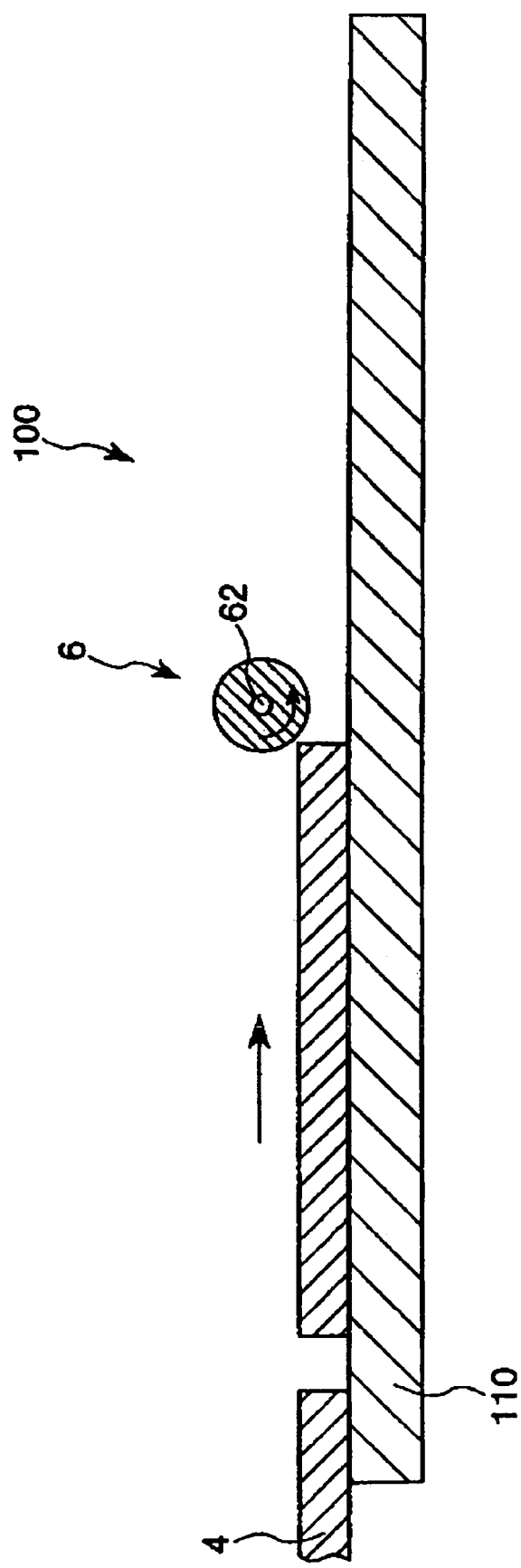
FIG. 7 is a longitudinal cross-sectional view which schematically shows one example of an apparatus for manufacturing a microlens substrate which can be applied to the method of manufacturing a microlens substrate according to the invention.

FIG. 7 is a longitudinal cross-sectional view which schematically shows one example of an apparatus for manufacturing a microlens substrate 1 which can be applied to the method of manufacturing a microlens substrate 1 according to the invention. FIGS. 8 and 9 are longitudinal cross-sectional views which schematically show a method of manufacturing a microlens substrate 1 in a preferred embodiment according to the invention. Now, in following explanations using FIG. 7, for convenience of explanation, an upper side, a lower side, a right side and a left side in FIG. 7 are referred to as "upper", "lower", "right" and "left", respectively.

First, prior to description of a method of manufacturing a microlens substrate 1 according to the invention, one example of the configuration of the apparatus for manufacturing a microlens substrate 1 applied to the method of manufacturing a microlens substrate 1 of the invention will now be described.

As shown in FIG. 7, the apparatus 100 for manufacturing a microlens substrate 1 includes substrate conveying apparatus 110 for conveying a substrate 4 as a base material of the microlens substrate 1, and a mold 6 for manufacturing a microlens substrate 1 as described above.

The substrate conveying apparatus 110 has a function of conveying the substrate 4. In the configuration shown in FIG. 7, the substrate conveying apparatus 110 is constructed so as to convey the substrate 4 from left to right of the apparatus 100 for manufacturing a microlens substrate 1 shown in FIG. 7.

The mold 6 for manufacturing a microlens substrate 1 has a function of transferring the shape of the outer peripheral surface thereof to the surface of the substrate 4 by pressing the substrate 4 conveyed by the substrate conveying apparatus 110

Further, the mold 6 for manufacturing a microlens substrate 1 has a roll shape, and can rotate around an axis (axis of rotation) 62. Moreover, as described above, the mold 6 for manufacturing a microlens substrate 1 is provided with a plurality of concave portions 61 each having a predetermined concave shape corresponding to the shape of each of the microlenses 21. The mold 6 for manufacturing a microlens substrate 1 can rotate around the axis 62. The mold 6 for manufacturing a microlens substrate 1 may be constructed so as to rotate by being pressed by means of the conveyed substrate 4 and rotated along with the movement (transport) of the substrate 4 (that is, the mold 6 for manufacturing a microlens substrate 1 is rotatably held), or so as to rotate with a driver such as a motor (not shown in the drawings). In the case where the mold 6 for manufacturing a microlens substrate 1 is provided with such a driver, it is possible to control the rotation speed of the mold 6 for manufacturing a microlens substrate 1 more accurately in accordance with the conveying speed of the substrate 4 and the like. As a result, it is possible to form the microlenses 21 each having an appropriate shape more surely.

Furthermore, such a mold 6 for manufacturing a microlens substrate 1 is arranged to be spaced apart from the substrate conveying apparatus 110 by a predetermined distance. The minimum distance between the mold 6 for manufacturing a microlens substrate 1 and the substrate conveying apparatus 110 is generally shorter than the thickness of the substrate 4. Further, the mold 6 for manufacturing a microlens substrate 1 may be provided with a heating device (not shown in the drawings) therein. This makes it possible to transfer the shape of the outer peripheral surface of the mold 6 for manufacturing a microlens substrate 1 to the surface of the substrate 4 easily and surely. As for such a heating device, for example, heating wire, cartridge heater and the like may be mentioned.

Next, the method of manufacturing a microlens substrate 1 according to the invention using the apparatus 100 for manufacturing a microlens substrate 1 provided with the mold 6 for manufacturing a microlens substrate 1 as described above will be described.

<B1> First, a substrate 4 is prepared when manufacturing a microlens substrate 1.

The substrate 4 is formed of a material corresponding to the constituent material of the main substrate 2 described above. A substrate having an even thickness and no scratch or the like is used as the substrate 4 suitably. Although the substrate 4 is any one as long as it can be transformed by being pressed by means of the mold 6 for manufacturing a microlens substrate 1, it is preferable that the substrate 4 is formed of a resin material (in particular, thermoplastic resin) as a main material in order to form the microlenses 21 having a shape and arrangement corresponding to those of the concave portions 61 of the mold 6 for manufacturing a microlens substrate 1 accurately.

The average thickness of the substrate 4 may vary depending upon various conditions such as a gap (minimum length) between the mold 6 for manufacturing a microlens substrate 1 and the substrate conveying apparatus 110, a material constituting the substrate 4, and an index of refraction thereof. Generally, it is preferable that the average thickness of the substrate 4 is in the range of about 0.005 to 5 mm, and more preferably it is in the range of about 0.1 to 4 mm. Further more preferably it is in the range of about 0.5 to 3 mm, and most preferably it is in the range of about 1 to 3 mm.

In this regard, for example, light diffusion media such as beads-shaped silica, glass, and resin (resin different from the resin constituting the substrate 4) may be included in the material constituting the substrate 4. This makes it possible to improve the angle of view characteristics of a transmission screen in the case where the microlens substrate 1 is applied to the transmission screen 10 described above. Further, for example, since it is possible to improve the angle of view characteristics of a screen of the transmission screen 10 even though the configuration of the diffusion plate or the like is omitted, it is possible to make the transmission screen 10 and/or the rear projection 300 thinner.

Figure 8A:
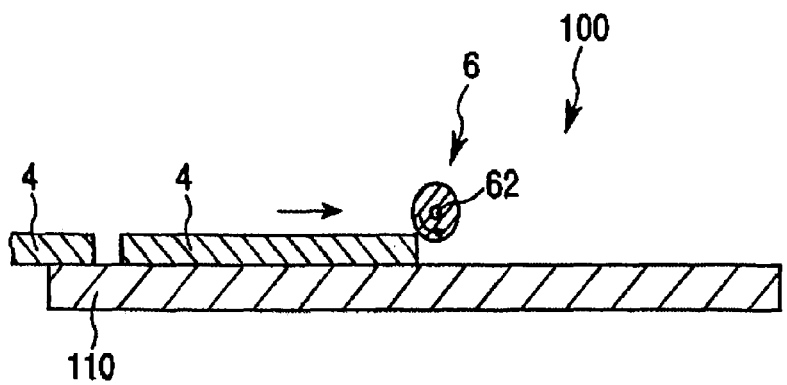
FIG. 8 is a longitudinal cross-sectional view which schematically shows a method of manufacturing a microlens substrate in a preferred embodiment according to the invention.

<B2> The substrate 4 as described above is conveyed by means of the substrate conveying apparatus 110 (see FIG. 8A). At this time, the substrate 4 may be heated if needed. This makes it possible to transfer the shape of the outer peripheral surface of the mold 6 for manufacturing a microlens substrate 1 easily and surely.

Figure 8B:
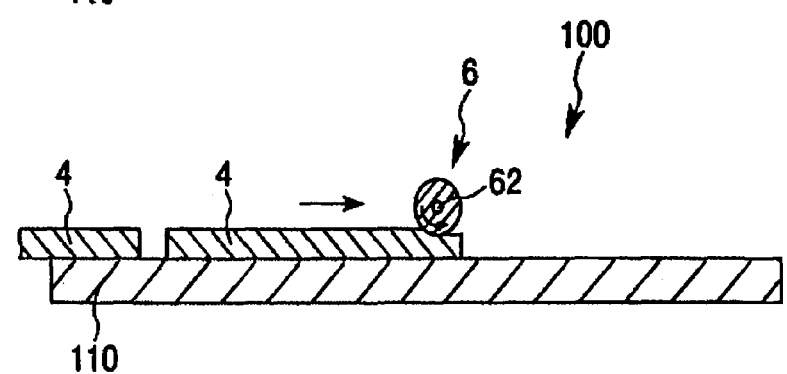
Figure 8C:
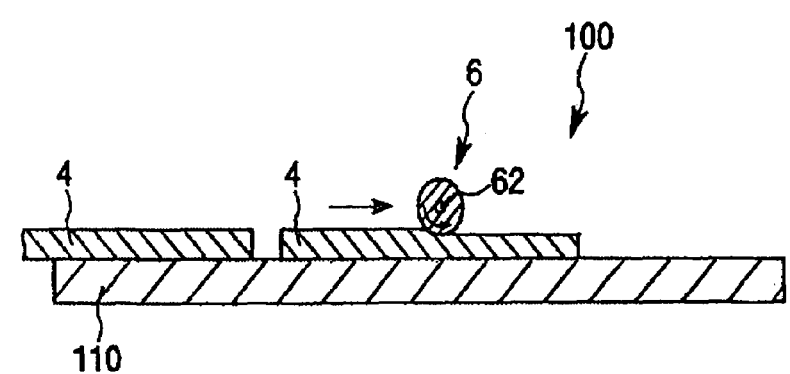
Figure 8D:
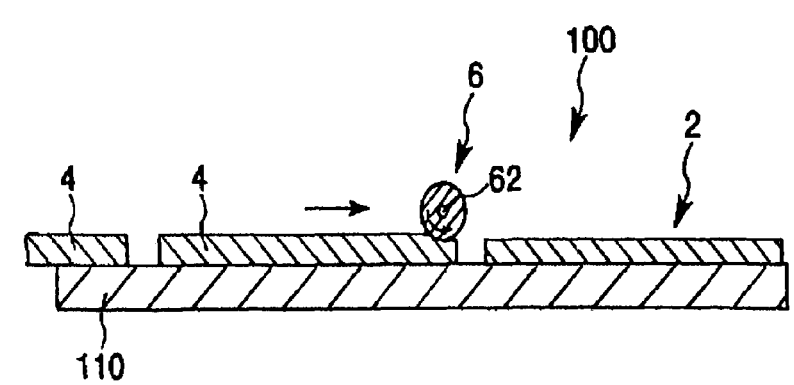

The substrate 4 conveyed by means of the substrate conveying apparatus 110 is fed in the space between the substrate conveying apparatus 110 and the mold 6 for manufacturing a microlens substrate 1 (see FIG. 8B). Thus, the substrate 4 is pressed by the mold 6 for manufacturing a microlens substrate 1. Further, the mold 6 for manufacturing a microlens substrate 1 rotates around the axis 62 thereof along with the delivery of the substrate 4, and the pressed portion of the substrate 4 by the mold 6 for manufacturing a microlens substrate 1 varies with time (see FIG. 8C). As a result, the shape of the outer peripheral surface of the mold 6 for manufacturing a microlens substrate 1 is transferred onto the surface of the substrate 4. Then, by solidifying (including curing (polymerizing) in this case) the constituent material of the substrate 4, the main substrate 2 in which a plurality of microlenses 21 each having a convex shape and arrangement corresponding to those of the concave portions 61 is obtained (see FIG. 8D). In the case where the solidification of the constituent material of the substrate 4 is carried out by being hardened (polymerized), the method thereof is not particularly limited, and it is appropriately selected according to the kind of the constituent material of the substrate 4. For example, irradiation with light such as ultraviolet rays, heating, electron beam irradiation, or the like may be mentioned.

In the case where the substrate 4 is formed of a resin material, it is preferable that the temperature of the mold 6 for manufacturing a microlens substrate 1 when pressing the substrate 4 (that is, base material) is higher than a glass transition point of the resin material. This makes it possible to transfer the shape of the outer peripheral surface of the mold 6 for manufacturing a microlens substrate 1 to the surface of the substrate 4 surely. On the other hand, in the case where the temperature of the mold 6 for manufacturing a microlens substrate 1 is too low, there is a case where it is difficult to transfer the shape of the outer peripheral surface of the mold 6 for manufacturing a microlens substrate 1 to the surface of the substrate 4 sufficiently depending upon the temperature of the substrate 4 before pressing or the constituent material of the substrate 4.

In this way, in the invention, since the roll-shaped mold 6 for manufacturing a microlens substrate 1 is used, it is possible to manufacture even a microlens substrate 1 having a large area to be manufactured easily and surely. In addition, this makes it possible to improve the characteristics (in particular, optical characteristics) of the microlens substrate 1 to be manufactured. Further, since it is possible to manufacture the microlens substrates 1 consecutively, it is possible to improve the productivity of the microlens substrate 1. Moreover, it is possible to make the size of the mold 6 for manufacturing a microlens substrate 1 sufficiently smaller than that of the microlens substrate to be manufactured, and it is possible to apply to manufacture various types of microlens substrates having various sizes even though the size (in particular, diameter) of the mold 6 for manufacturing a microlens substrate 1 is relatively small. Therefore, it is possible to contribute decrease of the manufacturing costs of the microlens substrate 1.

Further, in the case where the substrate 4 is any one of a sheet shape, a film shape, a plate shape having flexibility and the like, for example, it is possible to improve the productivity of the microlens substrate 1 further (and to reduce the size of a manufacturing facility (that is, the apparatus 100 for manufacturing a microlens substrate 1) by constructing the apparatus 100 for manufacturing a microlens substrate 1 so that the substrate 4 is wound to a substrate supply portion such as a roller and the substrate 4 is then pulled from the substrate supply portion as the substrate conveying apparatus 110 conveys the substrate 4. Moreover, in this case, the microlens substrate 1 thus manufactured may be collected by means of a microlens substrate collecting device such as a roller, for example.

<B3> Next, a process that a black matrix 3 is formed on the light emission surface of the main substrate 2 manufactured as described above will be described.

Figure 9A:
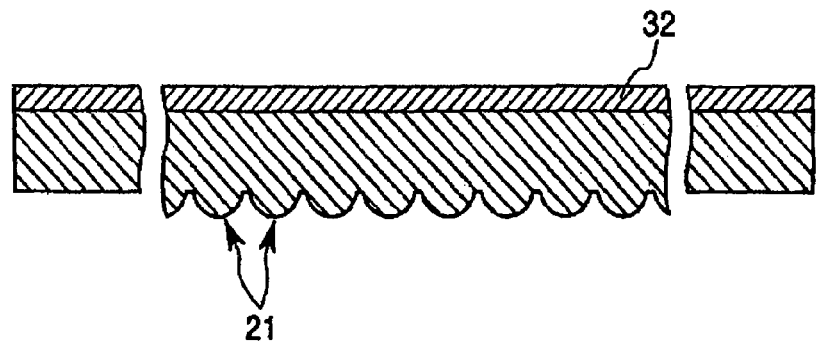
FIG. 9 is a longitudinal cross-sectional view which schematically shows a method of manufacturing a microlens substrate in a preferred embodiment according to the invention.

First, as shown in FIG. 9A, a positive type photopolymer 32 having light shielding (blocking) effect is supplied onto the light emission surface of the main substrate 2. As the method of supplying the positive type photopolymer 32 onto the light emission surface of the main substrate 2, for example, various types of coating methods such as a dip coat method, a doctor blade method, a spin coat method, a blush coat method, a spray coating, an electrostatic coating, an electrodeposition coating, roll coater, and the like can be utilized. The positive type photopolymer 32 may be constituted from a resin having light shielding (blocking) effect, or may be one in which a material having light shielding (blocking) effect is dispersed or dissolved to a resin material having low light shielding (blocking) effect. Heat treatment such as a pre-bake process, for example, may be carried out after supplying the positive type photopolymer 32 if needed.

Figure 9B:
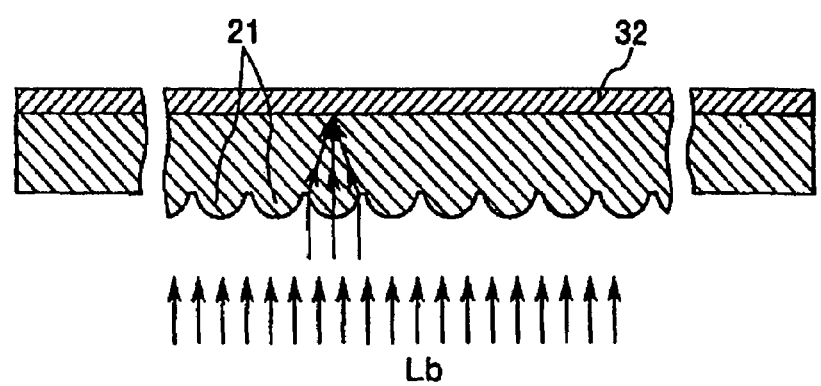

<B4> Next, as shown in FIG. 9B, light Lb for exposure is irradiated to the main substrate 2 in a direction perpendicular to the light incident surface of the main substrate 2. The irradiated light Lb for exposure is condensed by passing through each of the microlenses 21. The positive type photopolymer 32 in the vicinity of the focal point f of each of the microlenses 21 is exposed, and the positive type photopolymer 32 corresponding to portions other than the vicinity of the focal points f is not exposed or slightly exposed (that is, the degree of exposure is small). In this way, only the positive type photopolymer 32 in the vicinity of the respective focal points f is exposed.

Figure 9C:
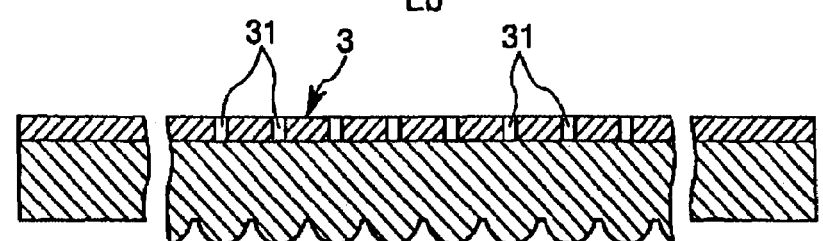

The development is then carried out. In this case, since the photopolymer 32 is a positive type photopolymer, the exposed photopolymer 32 in the vicinity of the respective focal points f is melt and removed by the development. As a result, as shown in FIG. 9C, the black matrix 3 in which the openings 31 are formed on the portions corresponding to the optical axes L of the microlenses 22 is provided. The developing method may be selected arbitrarily depending on composition of the positive type photopolymer 32 or the like. For example, the development of the positive type photopolymer 32 in the present embodiment can be carried out using an alkaline aqueous solution such as a solution of potassium hydroxide or the like.

In this way, in the method of manufacturing a microlens substrate 1 of the invention, since the black matrix 3 is formed by irradiating the photopolymer 32 with the light for exposure condensed by the plurality of microlenses 21, it is possible to form the black matrix 3 with simpler process compared with the case of using a photolithography technology, for example.

Further, heat treatment such as a post-bake process may be carried out after exposing the positive type photopolymer 32 if needed.

Figure 9D:
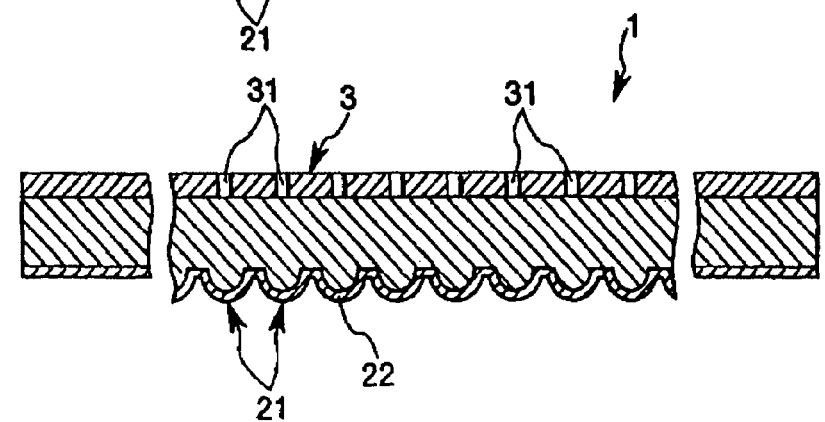

<B5> Then, by supplying a coloring liquid onto the main substrate 2 on which the black matrix 3 has been formed, a colored portion 22 is formed, whereby a microlens substrate 1 is obtained (see FIG. 9D).

The coloring liquid is not particularly limited, and in the present embodiment, the coloring liquid is one containing a coloring agent and benzyl alcohol. The invention found that it is possible to carry out the coloring of the main substrate easily and surely by using such a coloring liquid. In particular, according to the processes, it is possible to subject a main substrate 2 formed of a material such as an acrylic based resin which it is difficult to color in a conventional coloring method to a coloring process easily and surely. It is thought that this is for the following reasons.

Namely, by using the coloring liquid containing benzyl alcohol, the benzyl alcohol in the coloring liquid penetrates the main substrate 2 deeply and diffuses therein, whereby the bonding of molecules (the bonding between the molecules) constituting the main substrate 2 is loosened, and spaces in which the coloring agent is to penetrate are secured. The benzyl alcohol and the coloring agent in the coloring liquid are replaced, by which the coloring agent is held in the spaces (which can be likened to seats for the coloring agent (coloring seats)), and therefore, the surface of the main substrate 2 is colored.

Further, by using the coloring liquid as described above, it is possible to form the colored portion 22 having an even thickness easily and surely. In particular, even though a main substrate (that is, work) to be colored is one in which a minute structure such as microlenses is provided on the surface thereof (one in which a cycle of unevenness in a two-dimensional direction of the surface thereof is small) or one in which the region to be colored is a large area, it is possible to form the colored portion 22 with an even thickness (that is, without color heterogeneity).

As the method of supplying the coloring liquid onto the light incident surface of the main substrate 2, for example, various types of coating methods such as a doctor blade method, a spin coat method, a blush coat method, a spray coating, an electrostatic coating, an electrodeposition coating, printing, roll coater, and a dipping method in which the main substrate 2 is immersed (soaked) in the coloring liquid, and the like may be mentioned. The dipping method (in particular, dip dyeing) is suitable among these methods. This makes it possible to form the colored portion 22 (in particular, the colored portion 22 having an even thickness) easily and surely. Further, in particular, in the case where the coloring liquid is supplied onto the main substrate 2 by means of dip dyeing, it is possible to color even a main substrate 2 formed of a material such as an acrylic based resin which it is difficult to color in a conventional coloring method easily and surely. It is thought that this is because the dye that can be used for dip dyeing has high affinity to an ester group (ester bonding) that acrylic based resin or the like has.

It is preferable that the coloring liquid supplying step is carried out while the coloring liquid and/or the main substrate 2 are heated at the range of 60 to 100° C. This makes it possible to form the colored portion 22 efficiently while preventing a harmful influence (for example, deterioration of the constituent material of the main substrate 2) on the main substrate 2 on which the colored portion 22 is to be formed from being generated sufficiently. Further, the coloring liquid supplying step may be carried but while the ambient pressure is heightened (with application of pressure). This makes it possible to accelerate the penetration of the coloring liquid into the inside of the main substrate 2, and as a result, it is possible to form the colored portion 22 efficiently with a short time.

In this regard, the step of supplying the coloring liquid may be carried out repeatedly (that is, multiple times) if needed (for example, in the case where the thickness of the colored portion 22 to be formed is relatively large). Further, the main substrate 2 may be subjected to heat treatment such as heating, cooling and the like, irradiation with light, pressurization or decompression of the atmosphere, or the like after supplying the coloring liquid if needed. This makes it possible to accelerate the fixing (stability) of the colored portion 22.

Hereinafter, the coloring liquid used at the present step will be described in detail.

The content by percentage of the benzyl alcohol in the coloring liquid is not particularly limited. It is preferable that the content by percentage of the benzyl alcohol is in the range of 0.01 to 10.0% by weight. More preferably it is in the range of 0.05 to 8.0% by weight, and further more preferably it is in the range of 0.1 to 5.0% by weight. In the case where the content by percentage of benzyl alcohol is restricted within the above ranges, it is possible to form the suitable colored portion 22 easily and surely while preventing a harmful influence (such as deterioration of the constituent material of the main substrate 2) on the main substrate 2 on which the colored portion 22 is to be formed from being generated more efficiently.

The coloring agent contained in the coloring liquid may be any one such as various dyes and various pigments, but it is preferable that the coloring agent is a die. More preferably it is a disperse dye and/or a cationic dye, and further more preferably it is a disperse dye. This makes it possible to form the colored portion 22 efficiently while preventing a harmful influence on the main substrate 2 on which the colored portion 22 is to be formed (for example, deterioration of the constituent material of the main substrate 2) from being generated sufficiently. In particular, it is possible to color even a main substrate 2 formed of a material such as an acrylic based resin which it is difficult to color in a conventional coloring method easily and surely. It is thought that this is because it is easy to color such a material because the coloring agent as described above uses ester functions (ester bonding) that acrylic based resin or the like has as the coloring seats.

As described above, although the coloring liquid used in the present embodiment contains at least the coloring agent and benzyl alcohol, it is preferable that the coloring liquid further contains at least one compound selected from the benzophenone based compound and the benzotriazole based compound and benzyl alcohol. This makes it possible to form the colored portion 22 more efficiently while preventing a harmful influence (for example, deterioration of the constituent material of the main substrate 2) on the main substrate 2 on which the colored portion 22 is to be formed from being generated sufficiently. It is thought that this is for the following reasons.

Namely, by using the coloring liquid containing benzyl alcohol, and at least one kind of compound selected from a benzophenone based compound and a benzotriazole based compound (hereinafter, benzyl alcohol, the benzophenone based compound and the benzotriazole based compound are collectively referred to as "additives"), the additives in the coloring liquid penetrates the main substrate 2 and diffuses therein, whereby the bonding of molecules (the bonding between the molecules) constituting the main substrate 2 is loosened, and spaces in which the coloring agent is to penetrate are secured. The additives and the coloring agent are replaced, by which the coloring agent is held in the spaces (which can be likened to seats for the coloring agent (coloring seats)), and therefore, the surface of the main substrate 2 is colored. It is thought that this is because, by using the at least one compound selected from the benzophenone based compound and the benzotriazole based compound and benzyl alcohol together, they interact with each other in a complementary manner, and the coloring by the coloring liquid becomes good.

As for the benzophenone based compound, a compound having a benzophenone skeleton, its tautomers, or these inductors (for example, addition reaction products, substitution reaction products, reductive reaction products, oxidation reaction products and the like) can be utilized.

As for such compounds, for example, benzophenone, 2,4-dihydroxybenzophenone, 2-hydroxy-4-methoxybenzophenone, 2,2'-dihydroxy-4,4'-dimethoxybenzophenone, 2,2',4,4-tetrahydroxybenzophenone, 2-hydroxy-4-octylbenzophenone, 4-benzyloxy-2-hydroxybenzophenone, benzophenone anil, benzophenone oxime, benzophenone chloride ($\alpha,\alpha'$-dichlorodiphenylmethane) and the like may be mentioned. The compound that has benzophenone skeleton is preferable among these compounds, and more preferably the compound is any one of 2,2'-dihydroxy-4,4'-dimethoxybenzophenone and 2,2',4,4-tetrahydroxybenzophenone. By using such a benzophenone based compound, the effects as described above appear remarkably.

Further, as for the benzotriazole based compound, a compound having a benzotriazole skeleton, its tautomers, or these inductors (for example, addition reaction products, substitution reaction products, reductive reaction products, oxidation reaction products and the like) can be utilized.

As for such compounds, for example, benzotriazole, 2-(2-hydroxy-5-methylphenyl)-2H-benzotriazole, 2-(2-hydroxy-4-octyloxyphenyl)-2H-benzotriazole and the like may be mentioned. The compound that has benzotriazole skeleton is preferable among these compounds, and more preferably the compound is any one of 2-(2-dihydroxy-5-methylphenyl)-2H-benzotriazole and 2-(2-hydroxy-4-octyloxyphenyl)-2H-benzotriazole. By using such a benzotriazole based compound, the effects as described above appear remarkably.

In the case where the benzophenone based compound and/or the benzotriazole based compound is contained in the coloring liquid, the total content by percentage of the benzophenone based compound and the benzotriazole based compound in the coloring liquid is not particularly limited. It is preferable that the total content by percentage of the benzophenone based compound and the benzotriazole based compound in the coloring liquid is in the range of 0.001 to 10.0% by weight. More preferably it is in the range of 0.005 to 5.0% by weight, and further more preferably it is in the range of 0.01 to 3.0% by weight. In the case where the total content by percentage of the benzophenone based compound and the benzotriazole based compound is restricted within the above ranges, it is possible to form the suitable colored portion 22 easily and surely while preventing a harmful influence (such as deterioration of the constituent material of the main substrate 2) on the main substrate 2 on which the colored portion 22 is to be formed from being generated more efficiently.

Further, in the case where the benzophenone based compound and/or the benzotriazole based compound is contained in the coloring liquid, and the content by percentage of the benzophenone-based compound in the coloring liquid is defined as X (% by weight) and the total content by percentage of the benzophenone based compound and the benzotriazole based compound in the coloring liquid is defined as Y (% by weight), then it is preferable that X and Y satisfy the relation: $0.001 \leq X/Y \leq 10000$. More preferably X and Y satisfy the relation: $0.05 \leq X/Y \leq 1000$, and further more preferably X and Y satisfy the relation: $0.25 \leq X/Y \leq 500$. In the case where X and Y satisfy the relations as described above, synergistic effects by using the benzophenone based compound and/or the benzotriazole based compound together with benzyl alcohol are exerted more remarkably. In addition, it is possible to form the suitable colored portion 22 with a high speed easily and surely while preventing a harmful influence (such as deterioration of the constituent material of the main substrate 2) on the main substrate 2 on which the colored portion 22 is to be formed from being generated more efficiently.

Further, it is preferable that the, coloring liquid further contains benzyl alcohol and a surfactant. This makes it possible to disperse the coloring agent stably and evenly even under the conditions in which benzyl alcohol exists. Even though the main material 2 onto which the coloring liquid is to be supplied is formed of a material such as an acrylic based resin that it is difficult to color in a conventional method, it is possible to color the main substrate 2 easily and surely. As for a surfactant, nonionic surfactants, anionic surfactants, cationic surfactants, ampholytic surfactants and the like may be mentioned. As for the nonionic surfactant, for example, ether based surfactants, ester based surfactants, ether ester based surfactants, nitrogenous based surfactants and the like may be mentioned. More specifically, polyvinyl alcohol, carboxymethylcellulose, polyethylene glycol, acrylic ester, methacrylic ester, and the like may be mentioned. Further, as for anionic surfactants, for example, various kinds of rosins, various kinds of carboxylates, various kinds of ester sulfates, various kinds of sulfonates, various kinds of ester phosphates, and the like may be mentioned. More specifically, gum rosin, polymerized rosin, disproportionated rosin, maleic rosin, fumaric rosin, maleic rosin pentaester, maleic rosin glycerolester, tristearate (for example, metal salt such as aluminum salt), distearate (for example, metal salt such as aluminum salt, barium salt), stearate (for example, metal salt such as calcium salt, lead salt, zinc lead salt), linolenate (for example, metal salt such as cobalt salt, manganese salt, lead salt, zinc salt), octanoate (for example, metal salt such as aluminum salt, calcium salt, cobalt salt), oleate (for example, metal salt such as calcium salt, cobalt salt), palmitate (metal salt such as zinc salt), naphthenate (for example, metal salt such as calcium salt, cobalt salt, manganese salt, lead salt, zinc salt), resinate (for example, metal salt such as calcium salt, cobalt salt, manganese salt, zinc salt), polyacrylate (for example, metal salt such as sodium salt), polymethacrylate (for example, metal salt such as sodium salt), polymaleate (for example, metal salt such as sodium salt), acrylate-maleate copolymer (for example, metal salt such as sodium salt), cellulose, dodecylbezenesulfonate (for example, metal salt such as sodium salt), alkylsulfonate salt, polystyrenesulfonate, (for example, (for example, metal salt such as sodium salt), alkyldiphenyletherdisulfonate (for example, metal salt such as sodium salt), and the like may be mentioned. Further, as for cationic surfactants, for example, various kinds of ammonium salts such as primary ammonium salt, secondary ammonium salt, tertiary ammonium salt, quaternary ammonium salt may be mentioned. More specifically, monoalkylamine salt, dialkylamine salt, trialkylamine salt, tetraalkylamine salt, benzalkonium salt, alkylpyridinium salt, imidazolium salt, and the like may be mentioned. Further, as for ampholytic surfactants, for example, various kinds of betaines such as carboxybetaine, sulfobetaine, various kinds of aminocarboxylic acids, various kinds of ester phosphate salts, and the like may be mentioned.

Next, another method of manufacturing the microlens substrate 1 using the mold 6 for manufacturing a microlens substrate 1 will now be described.

Figure 10:
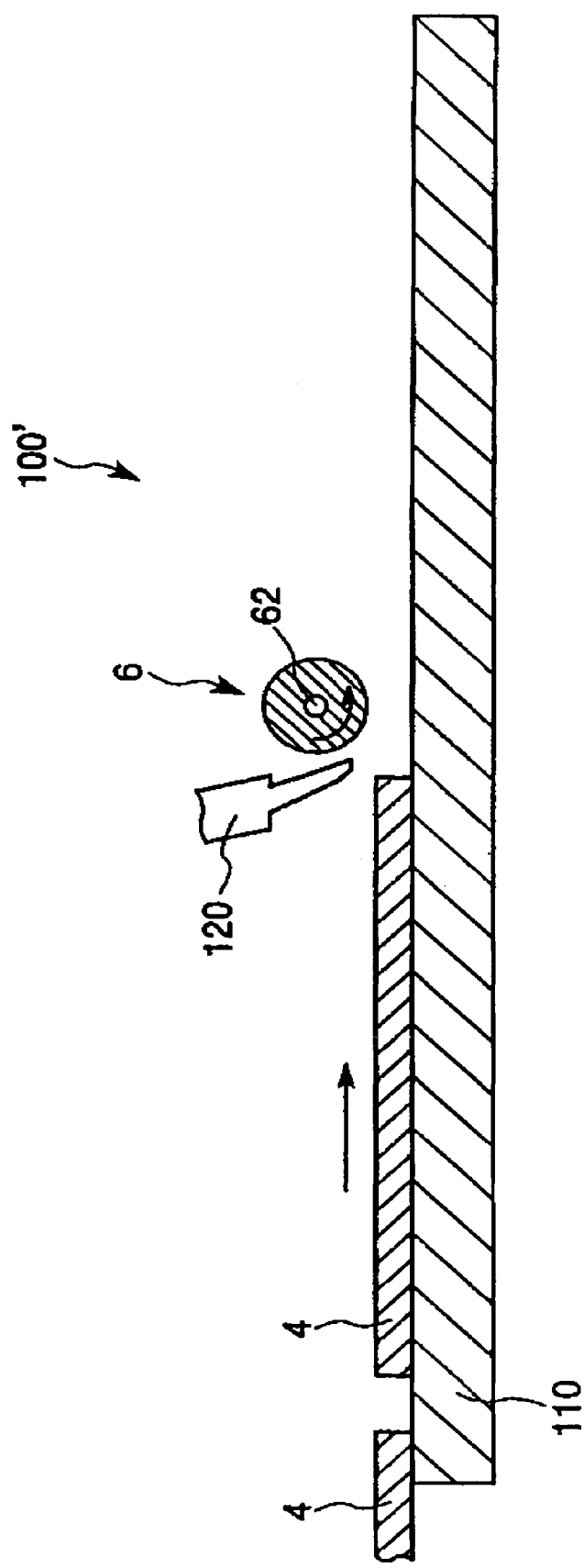
FIG. 10 is a longitudinal cross-sectional view which schematically shows another example of an apparatus for manufacturing a microlens substrate which can be applied to the method of manufacturing a microlens substrate according to the invention.

FIG. 10 is a longitudinal cross-sectional view which schematically shows another example of an apparatus for manufacturing a microlens substrate 1 which can be applied to the method of manufacturing a microlens substrate 1 according to the invention. FIG. 11 is a longitudinal cross-sectional view which schematically shows a method of manufacturing a microlens substrate 1 in another embodiment according to the invention.

In the following explanation, differences between the embodiment described above and this embodiment are chiefly described, and the description of the similar explanations is omitted. As shown in FIG. 10, the apparatus 100' for manufacturing a microlens substrate 1 of the present embodiment includes: a substrate conveying apparatus 110 for conveying a substrate 4 as a base material of the microlens substrate 1; a fluid resin supply portion 120 for supplying a resin material (fluid resin material) 9 having fluidity onto the substrate 4; and a mold 6 for manufacturing a microlens substrate 1 as described above. Namely, the apparatus 100' for manufacturing a microlens substrate 1 of the present embodiment differs from the apparatus 100 for manufacturing a microlens substrate 1 of the previous embodiment described above in view of having the fluid resin supply portion 120. By providing the fluid resin supply portion 120, it is possible to transfer the shape of the outer peripheral surface of the mold 6 for manufacturing a microlens substrate 1 to the resin material while keeping the temperature of the substrate 4 at relative low temperature. As a result, it is possible to obtain the microlens substrate 1 provided with the plurality of microlenses 21 having appropriate shape and arrangement easily and surely while preventing the substrate 4 from deforming due to heat efficiently.

The fluid resin supply portion 120 is constructed so that the resin material 9 to be supplied is supplied onto the substantially whole surface of the substrate 4 (the portion corresponding to the usable lens region of the microlens substrate 1). In the present embodiment, a gap between the substrate conveying apparatus 110 and the mold 6 for manufacturing a microlens substrate 1 (that is, the minimum length between the substrate conveying apparatus 110 and the mold 6 for manufacturing a microlens substrate 1) is set to a predetermined length longer than the gap in the apparatus 100 for manufacturing a microlens substrate 1 of the previous embodiment described above. In this case, the gap between the substrate conveying apparatus 110 and the mold 6 for manufacturing a microlens substrate 1 is not particularly limited, but it is generally set to a predetermined length larger than the thickness of the substrate 4.

Next, the method of manufacturing a microlens substrate 1 according to the invention using the apparatus 100' for manufacturing a microlens substrate 1 provided with the mold 6 for manufacturing a microlens substrate 1 as described above will be described.

<B1'> First, a substrate 4 and a resin material 9 are prepared when manufacturing a microlens substrate 1. Although the same substrate 4 as that in the previous embodiment described above can be used as the substrate 4 suitably, one having a thickness thinner than that of the substrate 4 may be used in view of the thickness of the portion to be formed from the resin material 9. Further, it is preferable that a material that can keep fluidity at relative low temperature is used as the resin material 9.

It is preferable that a glass transformation point of the resin material 9 is in the range of 15 to 200° C. More preferably it is in the range of 20 to 150° C., and furthermore preferably it is in the range of 24 to 130° C. In the case where the glass transformation point of the resin material 9 is restricted within the above ranges, it is possible to transfer the shape of the outer peripheral surface of the mold 6 for manufacturing a microlens substrate 1 to the resin material 9 more surely. In this regard, for example, light diffusion media such as beads-shaped silica, glass, and resin (resin different from the resin constituting the substrate 4) may be included in the resin material 9. This makes it possible to improve the angle of view characteristics of a transmission screen in the case where the microlens substrate 1 is applied to the transmission screen 10 described above. Further, for example, since it is possible to improve the angle of view characteristics of a screen of the transmission screen 10 even though the configuration of the diffusion plate or the like is omitted, it is possible to make the transmission screen 10 and/or the rear projection 300 thinner.

Figure 11A:
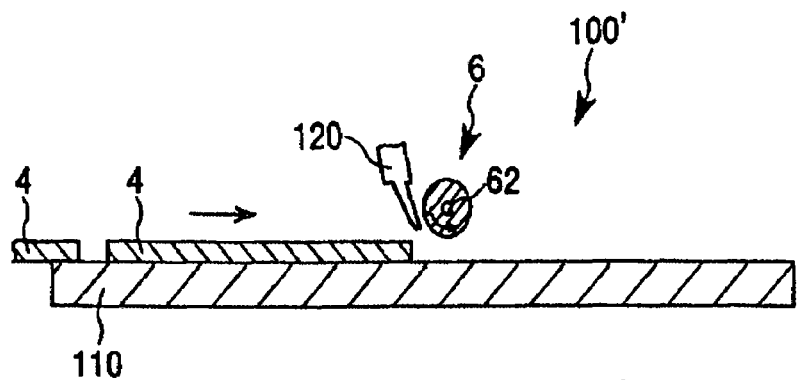
FIG. 11 is a longitudinal cross-sectional view which schematically shows a method of manufacturing a microlens substrate in another embodiment according to the invention.
Figure 11B:
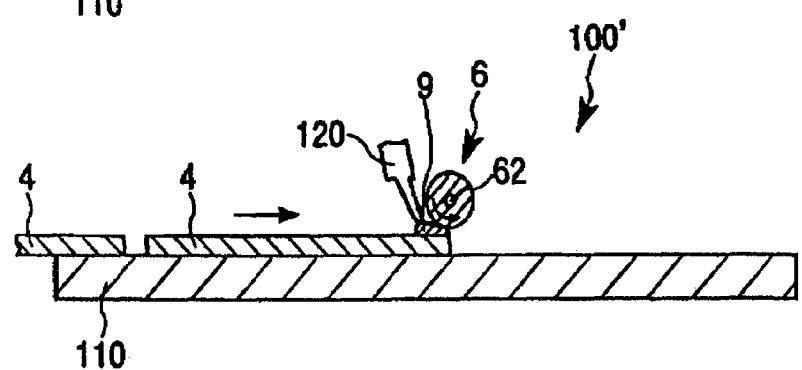
Figure 11C:
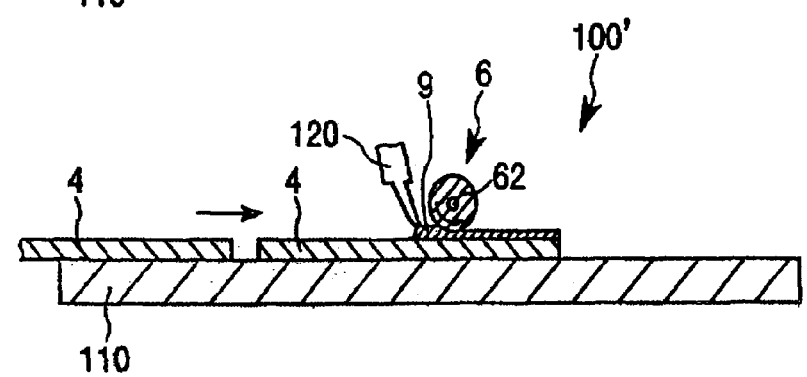
Figure 11D:
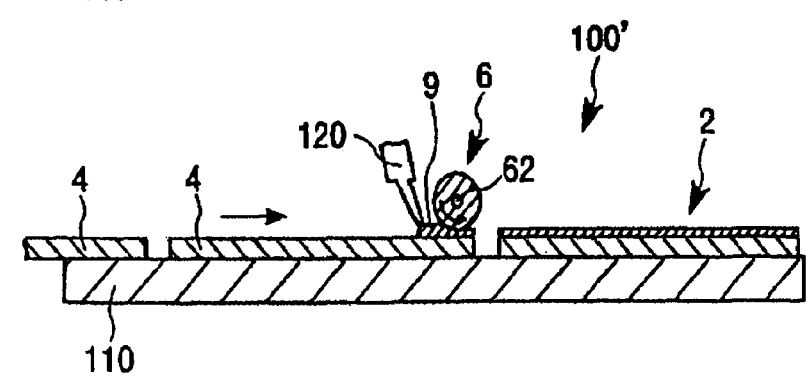

<B2'> The substrate 4 as described above is conveyed by means of the substrate conveying apparatus 110 (see FIG. 11A). At this time, the substrate 4 may be heated if needed. This makes it possible to transfer the shape of the outer peripheral surface of the mold 6 for manufacturing a microlens substrate 1 easily and surely.

The substrate 4 conveyed by means of the substrate conveying apparatus 110 is fed in the space between the substrate conveying apparatus 110 and the mold 6 for manufacturing a microlens substrate 1. At this time, the resin material 9 is supplied to the space between the substrate 4 and the mold 6 for manufacturing a microlens substrate 1 by means of the fluid resin supply portion 120 (see FIG. 11B). Thus, the resin material 9 is pressed by the mold 6 for manufacturing a microlens substrate 1 and the substrate 4. In this regard, since the resin material 9 is at the softened state (that is, the resin material 9 has fluidity moderately), the resin material 9 is transformed to the shape corresponding to the surface shape of the mold 6 for manufacturing a microlens substrate 1. Further, the mold 6 for manufacturing a microlens substrate 1 rotates around the axis 62 thereof along with the delivery of the substrate 4, and the pressed portion of the resin material 9 by the mold 6 for manufacturing a microlens substrate 1 varies with time (see FIG. 11C). As a result, the shape of the outer peripheral surface of the mold 6 for manufacturing a microlens substrate 1 is in turn transferred onto the resin material 9 without being bonded onto the substrate 4. Then, by solidifying (including curing (polymerizing) in this case) the constituent material of the resin material 9, the main substrate 2 in which a plurality of microlenses 21 each having a convex shape and arrangement corresponding to those of the concave portions 61 is obtained (see FIG. 11D). In the case where the solidification of the constituent material of the resin material 9 is carried out by being hardened (polymerized), the method thereof is not particularly limited, and it is appropriately selected according to the kind of the constituent material of the substrate 4. For example, irradiation with light such as ultraviolet rays, heating, electron beam irradiation, or the like may be mentioned.

It is preferable that the temperature of the mold 6 for manufacturing a microlens substrate 1 when pressing the resin material 9 is higher than a glass transition point of the constituent material of the resin material 9. This makes it possible to transfer the shape of the outer peripheral surface of the mold 6 for manufacturing a microlens substrate 1 to the resin material 9 surely. On the other hand, in the case where the temperature of the mold 6 for manufacturing a microlens substrate 1 is too low, there is a case where it is difficult to transfer the shape of the outer peripheral surface of the mold 6 for manufacturing a microlens substrate 1 to the resin material 9 sufficiently depending upon the temperature of the resin material 9 before pressing or the constituent material of the resin material 9.

In this regard, in the configuration shown in FIG. 11, although the resin material 9 is supplied onto the substrate 4 in the vicinity of the mold 6 for manufacturing a microlens substrate 1, the position where the resin material 9 is supplied onto the substrate 4 is not limited this position. For example, the resin material 9 may not be supplied onto the substrate 4 but onto the mold 6 for manufacturing a microlens substrate 1.

By forming the black matrix 3 and the colored portion 22 on the main substrate 2 obtained as described above as well as the embodiment described above (see the steps <B3> to <B5> described above and FIG. 9), it is possible to obtain the microlens substrate 1.

Hereinafter, a description will be given for a rear projection using the transmission screen described above.

Figure 12:
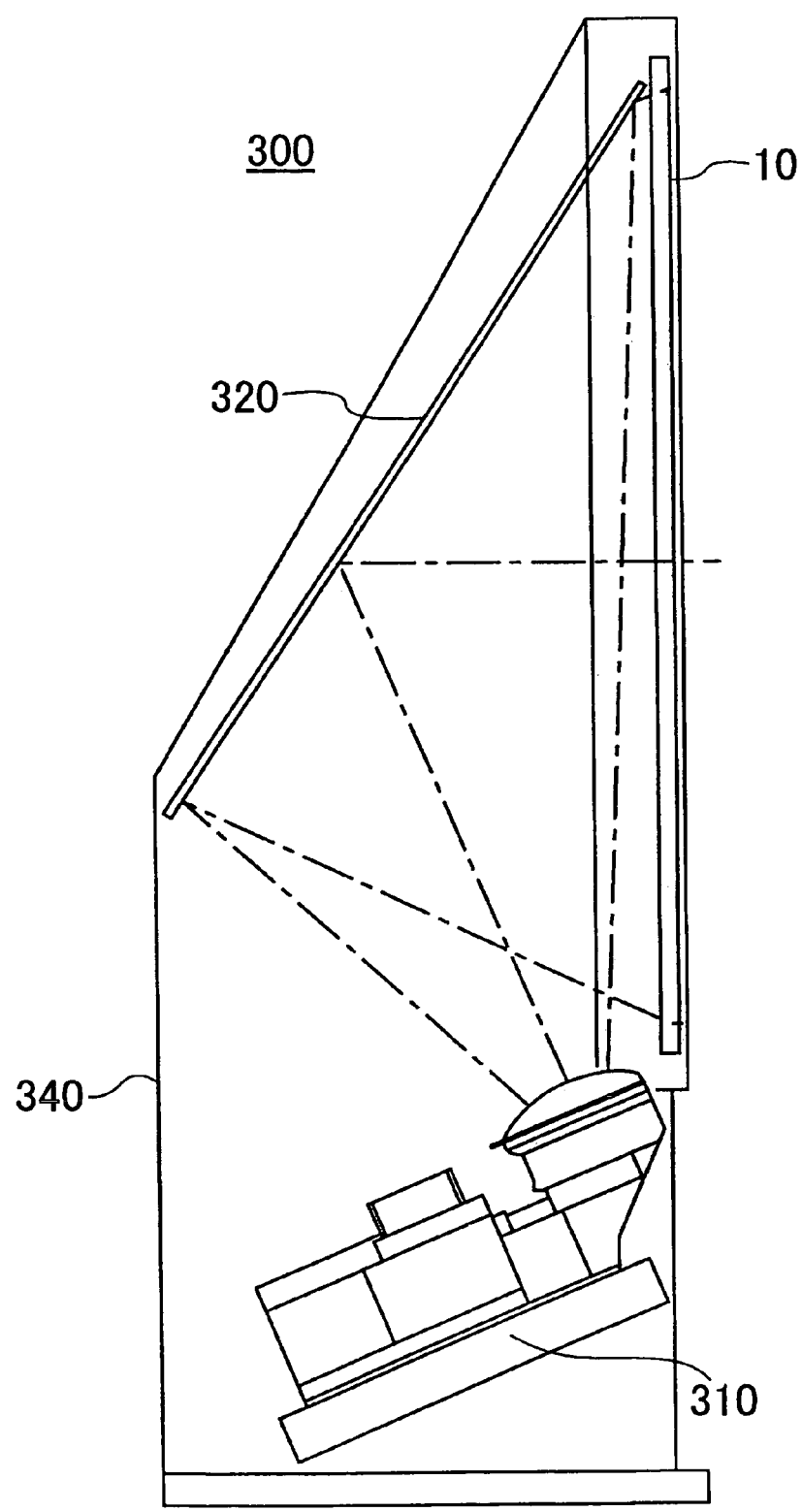
FIG. 12 is a drawing which schematically shows the configuration of a rear projection to which the transmission screen of the invention is applied.

FIG. 12 is a cross-sectional view which schematically shows a rear projection 300 to which the transmission screen 10 of the invention is applied. As shown in FIG. 12, the rear projection 300 has a structure in which a projection optical unit 310, a light guiding mirror 320 and a transmission screen 10 are arranged in a casing 340.

The rear projection 300 uses the transmission screen 10 that has excellent angle of view characteristics and light use efficiency as described above. For this reason, it is possible to make the rear projection 300 become a large size and have a high quality.

Further, since the microlenses 21 are optically arranged in a houndstooth check manner on the microlens substrate 1 described above, the rear projection 300 hardly generates problems such as moire, in particular.

As described above, it should be noted that, even though the mold 6 for manufacturing a microlens substrate 1, the method of manufacturing a microlens substrate 1, the microlens substrate 1, the transmission screen 10 and the rear projection 300 according to the invention have been described with reference to the preferred embodiments shown in the accompanying drawings, the invention is not limited to these embodiments. For example, each element (component) constituting the mold 6 for manufacturing a microlens substrate 1, the microlens substrate 1, the transmission screen 10 and the rear projection 300 may be replaced with one capable of performing the same or a similar function. For example, in the transmission screen 10 of the invention, a light diffusing plate, other lens or the like may be further arranged on the light emission surface of the microlens substrate 1.

Moreover, in the method of manufacturing the microlens substrate of the invention, it is possible to add any step for an arbitrary purpose if needed.

Furthermore, in the embodiment described above, even though it has been described that at the initial hole formation step in the method of manufacturing the mold 6 for manufacturing a microlens substrate 1 the initial concave portions 71 are formed in the base material 7 in addition to the initial holes 81, there is no need to form such initial concave portions 71. By appropriately adjusting the formation conditions for the initial holes 81 (for example, energy intensity of a laser, the beam diameter of the laser, irradiation time or the like), it is possible to form the initial concave portions 71 each having a predetermined shape, or it is possible to selectively form only the initial holes 81 so that the initial concave portions 71 are not formed.

Further, in the embodiment described above, even though it has been described that the concave portions 61 are formed on the outer peripheral surface of the roll-shaped base material to form the mold 6 for manufacturing a microlens substrate 1 by subjecting the roll-shaped base material to the etching process directly, for example, the mold 6 for manufacturing a microlens substrate 1 may be manufactured by winding the a sheet material on which the concave portions 61 are formed by the etching process on the outer peripheral surface of the roll-shaped base material.

Moreover, in the embodiment described above, even though it has been described that the black matrix 3 is formed on the one major surface of the base substrate 2 after the plurality of microlenses 21 are formed on the other major surface of the base substrate 2, for example, the plurality of microlenses 21 may be formed at the state where the photopolymer is supplied onto the one major surface of the base substrate 2 opposite to the major surface on which the plurality of microlenses 21 are to be formed in advance.

Furthermore, in the embodiment described above, even though it has been described that the microlens substrate 1 is manufactured using the mold 6 for manufacturing a microlens substrate 1, for example, a member manufactured using the mold 6 for manufacturing a microlens substrate 1 may be used for a mold for manufacturing a member with concave portions. In other words, the member (that is, mold for manufacturing a member with concave portions) having convex portions on one major surface thereof is manufactured by transferring the shape of the outer peripheral surface of the mold 6 for manufacturing a microlens substrate 1 onto the surface of the member, a member having concave portions on one major surface thereof may be manufactured using the member, that is, the mold for manufacturing a member with concave portions. This makes it possible to manufacture a microlens substrate or the like having concave lenses as the microlenses appropriately, for example. In this case, the mold for manufacturing a member with concave portions may have a plate shape or a roll shape.

Further, in the embodiment described above, even though it has been described that the transmission screen 10 is provided with the microlens substrate 1 and the Fresnel lens 5, the transmission screen 10 of the invention need not be provided with the Fresnel lens 5 necessarily. For example, the transmission screen 10 may be constructed from only the microlens substrate 1 of the invention practically.

Furthermore, in the embodiments described above, even though it has been described that the microlens substrate 1 is a member constituting the transmission screen 10 or the rear projection 300, the microlens substrate 1 is not limited to one to be applied described above, and it may be applied to one for any use.

EXAMPLE

<Manufacture of Microlens Substrate and Transmission Screen>

Example 1

A mold for manufacturing a microlens substrate was manufactured in the following manner.

First, a soda-lime glass base material having a cylinder-like shape (or roll shape) of 35 cm (diameter)×165 cm (height) was prepared as a base material.

The soda-lime glass base material was soaked in cleaning liquid containing 4% by weight ammonium hydrogen difluoride and 8% by weight hydrogen peroxide to carry out a 6 μm etching process, thereby cleaning its surface. Then, cleaning with pure water and drying with nitrogen ($N_2$) gas (for removal of pure water) were carried out.

Next, a laminated structure of chromium/chromium oxide (that is, laminated structure in which a layer formed of chromium oxide was laminated on the outer circumference of a layer formed of chromium) was formed on the outer circumference of the soda-lime glass base material by means of a spattering method. Namely, a mask (a film for mask) constructed from the laminated structure of chromium/chromium oxide was formed on the outer peripheral surface of the soda-lime glass base material. In this case, the thickness of the chromium layer is 0.03 μm, while the thickness of the chromium oxide layer is 0.01 μm.

Next, laser machining was carried out to the mask to form a large number of initial holes over the entire outer peripheral surface of the mask. In this regard, the laser machining was carried out using a YAG laser under the conditions of energy intensity of 1 mW, a beam diameter of 2.0 μm, and a scanning speed in a main scanning direction of 100 mm/second and irradiating the mask with laser beams intermittently. Further, the irradiation with laser beams was carried out so that a main scanning operation in the height direction of the roll-shaped soda-lime glass base material was carried out from the vicinity of one end portion of the outer peripheral surface thereof to the vicinity of the other end thereof, and the same scanning operation was carried out after rotating the roll-shaped soda-lime glass base material around the rotation axis thereof by a predetermined degree.

In this way, the initial holes each having a predetermined size were formed in a houndstooth check pattern over the substantially entire outer peripheral surface of the mask mentioned above. The average width between the adjacent two initial holes is 2.0 μm, and the average length of each of the initial holes was 2.1 μm. Further, at this time, concave portions each having a depth of about 0.05 μm and a damaged layer (or affected layer) were formed on the surface of the soda-lime glass base material.

Next, the soda-lime glass base material was subjected to a wet etching process, thereby forming a large number of concave portions (concave portions for forming microlenses) on the outer peripheral surface of the soda-lime glass substrate. The shape of each of the concave portions is a substantially elliptic shape (flat shape) when viewed from above the outer peripheral surface of the soda-lime glass base material. The large number of concave portions thus formed had substantially the same shape as each other. The length of each of the formed concave portions in the short axis direction thereof (diameter), the length of each of the formed concave portions in the long axis direction thereof, the radius of curvature and depth of each of the formed concave portions were 54 μm, 72 μm, 37.5 μm and 36.5 μm, respectively. Further, the share of the concave portions in a usable area in which the concave portions were formed was 97%.

In this regard, an aqueous solution containing 4% by weight ammonium hydrogen difluoride and 8% by weight hydrogen peroxide was used for the wet etching process as an etchant, and the soak time of the substrate was 2 hours. Further, the wet etching process was carried out while the soda-lime glass base material was rotated around the rotation axis thereof in the etchant. Moreover, the rotating direction of the soda-lime glass base material was reversed every 3.5 rounds of the soda-lime glass base material.

Next, the mask was removed by carrying out an etching process using a mixture of ceric ammonium nitrate and perchloric acid. Then, cleaning with pure water and drying with $N_2$ gas (removal of pure water) were carried out.

In this way, the mold for manufacturing microlens substrate as shown in FIG. 4 in which the large number of concave portions for forming microlenses were arranged in a houndstooth check manner on the outer peripheral surface of the soda-lime glass base material was obtained. A ratio (share) of an area occupied by all the concave portions in the obtained mold for manufacturing a microlens substrate in a usable area where the concave portions were formed with respect to the entire usable area was 97% when viewed from above the outer peripheral surface of the soda-lime glass base material.

In the mold for manufacturing a microlens substrate obtained as described above, the angle constructed from the long axis direction of each of the concave portions and the axis direction of the mold for manufacturing a microlens substrate was 0°.

Next, a mold release agent (GF-6110) was applied to the outer circumference of the mold for manufacturing a microlens substrate obtained as described above (on which the large number of concave portions were formed).

Next, an apparatus for manufacturing a microlens substrate as shown in FIG. 7 was manufactured using the mold for manufacturing a microlens substrate obtained as described above.

Next, a substrate was prepared as a base material for forming a main substrate. A sheet-like member constituted from acrylic resin (in which glass transformation point was 150° C.), and having a rectangle shape of 1.7 m×1.1 m and a thickness of 2 mm was prepared as the substrate.

Next, the substrate described above was positioned on a substrate conveying apparatus of the apparatus of manufacturing a microlens substrate.

The substrate on the substrate conveying apparatus was heated at 200° C. by a heater. The substrate conveying apparatus then conveyed the heated substrate at a predetermined velocity, and the surface shape of the mold for manufacturing a microlens substrate was transferred to the surface of the conveyed substrate by means of the mold for manufacturing a microlens substrate. At this time, the mold for manufacturing a microlens substrate was under a state where the vicinity of the surface of the mold for manufacturing a microlens substrate was heated at 185° C. by means of the heater.

Then, by cooling off the acrylic resin of the substrate, the acrylic resin was solidified to obtain a main substrate. The index of refraction of the obtained main substrate (that is, cured resin) was 1.50. The thickness of the obtained main substrate (except for portion where the microlenses were formed) was 1.095 μm. The lengths of each of the formed concave portions in the short and long axis directions (diameter), the radius of curvature and depth of each of the formed concave portions were 54 μm, 72 μm, 38 μm and 36.0 μm, respectively. Further, the share of the concave portions in a usable area in which the concave portions were formed was 97%.

A coloring liquid was then supplied to the main substrate by means of dip dyeing. This process was carried out so that the whole surface on which the microlenses were formed was brought into contact with the coloring liquid, but the surface opposite to the surface onto which the roll-shaped mold for manufacturing a microlens substrate was pressed was not in contact with the coloring liquid. Further, the temperature of the main substrate and the coloring liquid when supplying the first process liquid onto the main substrate was adjusted to be 90° C. Moreover, the pressure of the atmosphere was pressurized at the coloring liquid supplying process so as to be 120 kPa. A mixture containing disperse dye (Blue) (made by Futaba Sangyo): 2 part by weight, disperse dye (Red) (made by Futaba Sangyo): 0.1 part by weight, disperse dye (Yellow) (made by Futaba Sangyo): 0.05 part by weight, benzyl alcohol: 10 part by weight, a surfactant: 2 part by weight, and pure water: 1000 part by weight was used as the coloring liquid.

After the main substrate was brought into contact with the coloring liquid for 20 minutes under the conditions as described above, the main substrate was brought out from a bath in which the coloring liquid was stored, and the main substrate was then washed and dried.

By carrying out cleaning the main substrate with pure water and drying it with $N_2$ gas (removal of pure water), a microlens substrate having a rectangle shape of 1.6 m×1.0 m on which the colored portion has been formed was obtained. The color density of the colored portion thus formed was 5%.

Further, by carrying out the same processes as described above using the mold for manufacturing a microlens substrate repeatedly, total 500 pieces of microlens substrates were manufactured. Then, transmission screens as shown in FIG. 3 were manufactured using the first microlens substrate and the $500^{th}$ microlens substrate.

Example 2

First, a mold for manufacturing a microlens substrate was manufactured as well as in Example 1 described above.

Next, a mold release agent (GF-6110) was applied to the outer circumference of the mold for manufacturing a microlens substrate (on which the large number of concave portions were formed).

Next, an apparatus for manufacturing a microlens substrate as shown in FIG. 10 was manufactured using the mold for manufacturing a microlens substrate obtained as described above.

Next, a substrate as a base material for forming a main substrate and a resin material having fluidity were prepared. A sheet-like member constituted from acrylic resin (in which glass transformation point was 150° C.), and having a rectangle shape of 1.7 m×1.1 m and a thickness of 0.1 mm was prepared as the substrate. Further, acrylic resin (in which glass transformation point was 110° C.) was prepared as the resin material having fluidity.

Next, the substrate was positioned on a substrate conveying apparatus of the apparatus of manufacturing a microlens substrate, and the resin material having fluidity was stored in a resin storage unit connected to a fluid resin supply unit.

The substrate on the substrate conveying apparatus was heated at 180° C. by a heater. Further, the resin material stored in the resin storage unit was heated at 190° C. by a heater. The substrate conveying apparatus then conveyed the heated substrate at a predetermined velocity, and the resin material was supplied onto the conveyed substrate from the fluid resin supply unit. The substrate onto which the resin material was supplied was introduced between the substrate conveying apparatus and the mold for manufacturing a microlens substrate, and then the surface shape of the mold for manufacturing a microlens substrate was transferred to the resin material provided on the substrate in this region. At this time, the mold for manufacturing a microlens substrate was under a state where the vicinity of the surface of the mold for manufacturing a microlens substrate was heated at 185° C. by means of the heater.

Then, by irradiating the resin material on which the surface shape of the mold for manufacturing a microlens substrate was transferred with ultraviolet rays, the resin material provided on the substrate was cured to obtain a main substrate. The index of refraction of the obtained main substrate (that is, cured resin) was 1.62. The thickness of the obtained main substrate (except for portion where the microlenses were formed) was 0.05 μm. The lengths of each of the formed concave portions in the short and long axis directions (diameter), the radius of curvature and depth of each of the formed concave portions were 54 μm, 72 μm, 37.5 μm and 35.5 μm, respectively. Further, the share of the concave portions in a usable area in which the concave portions were formed was 97%.

Next, a positive type photopolymer to which a light shielding material (carbon black) was added (PC405G: made by JSR Corporation) was supplied onto the light emission surface of the main substrate obtained as described above (the surface opposite to the surface on which the microlenses had been formed) by means of roll coater. The content by percentage of the light shielding material in the photopolymer was 20% by weight.

Next, the main substrate was subjected to a pre-bake process of 90°×30 minutes.

Next, ultraviolet rays of 80 mJ/cm$^2$ were irradiated through the surface opposite to the surface onto which the photopolymer had been supplied as parallel light. Thus, the irradiated ultraviolet rays were condensed by each of the microlenses, and the photopolymer in the vicinity of the focal point f of each of the microlenses (in the vicinity of the thickness direction of the black matrix) was exposed selectively. The main substrate was then subjected to a developing process for 40 seconds using an aqueous solution containing 0.5% by weight KOH.

Then, cleaning with pure water and drying with $N_2$ gas (removal of pure water) were carried out. Further, the main substrate was subjected to a post-bake process of 200° C.×30 minutes. Thus, a black matrix having a plurality of openings respectively corresponding to the microlenses was formed. The thickness of the formed black matrix was 5 μm.

Next, by forming a diffusing portion on the surface side of the main substrate on which the black matrix has been formed, a microlens substrate having a rectangle of 1.6 m×1.0 m was obtained. The formation of the diffusing portion was carried out by jointing a diffused plate having a structure in which silica particles were diffused in the acrylic resin as diffusion media to the main substrate by means of heat sealing.

Further, by carrying out the same processes as described above using the mold for manufacturing a microlens substrate repeatedly, total 500 pieces of microlens substrates were manufactured. Then, transmission screens as shown in FIG. 3 were manufactured as well as Example 1 described above using the first microlens substrate and the 500$^{th}$ microlens substrate.

Examples 3 and 4

A microlens substrate and a transmission screen were manufactured in the manner similar to those in Example 1 described above except that the shape of each of the concave portions and the arrangement pattern of the concave portions of the mold for manufacturing a microlens substrate were changed by changing any of the configuration of the mask, the conditions of the irradiation with laser beams (that is, the shape of each of the initial holes to be formed) and the soaking time into the etchant, whereby the shape of each of the microlenses to be formed on the microlens substrate and the arrangement pattern of the microlenses were changed as shown in TABLE 1.

Examples 5 and 6

A microlens substrate and a transmission screen were manufactured in the manner similar to those in Example 1 described above except that the shape of each of the concave portions and the arrangement pattern of the concave portions of the mold for manufacturing a microlens substrate were changed by changing any of the configuration of the mask, the conditions of the irradiation with laser beams (that is, the shape of each of the initial holes to be formed) and the soaking time into the etchant, whereby the shape of each of the microlenses to be formed on the microlens substrate and the arrangement pattern of the microlenses were changed as shown in TABLE 1.

Example 7

A microlens substrate and a transmission screen were manufactured in the manner similar to those in Example 1 described above except that the shape of each of the concave portions and the arrangement pattern of the concave portions of the mold for manufacturing a microlens substrate were changed by changing any of the conditions of the irradiation with laser beams (that is, the shape of each of the initial holes to be formed) and the soaking time into the etchant, whereby the shape of each of the microlenses to be formed on the microlens substrate and the arrangement pattern of the microlenses were changed as shown in TABLE 1.

Example 8

A microlens substrate and a transmission screen were manufactured in the manner similar to those in Example 1 described above except that the shape of each of the concave portions and the arrangement pattern of the concave portions of the mold for manufacturing a microlens substrate were changed by changing any of the conditions of the irradiation with laser beams (that is, the shape of each of the initial holes to be formed) and the soaking time into the etchant, whereby the shape of each of the microlenses to be formed on the microlens substrate and the arrangement pattern of the microlenses were changed as shown in TABLE 1.

Comparative Example 1

A plate-shaped substrate with concave portions on which a large number of concave portions for forming microlenses (a mold for manufacturing a microlens substrate) were formed was manufactured in the following manner.

First, a soda-lime glass substrate having a rectangle shape of 1.7 m×1.1 m and a thickness of 2.0 mm was prepared.

The soda-lime glass was subjected to a 6 µm etching process by immersing (or soaking) it within a cleaning solution containing 4% by weight ammonium hydrogen difluoride and 8% by weight hydrogen peroxide, by which the surface thereof was cleaned. Then, cleaning with pure water and drying with $N_2$ gas (removal of pure water) were carried out.

Next, a laminated structure constructed from a layer formed of chromium and a layer formed of chromium oxide (that is, the laminated structure in which the chromium was laminated on the outer peripheral surface of the chromium oxide) was formed on the soda-lime glass substrate by means of a sputtering method. Namely, a mask and a back surface protective film each constructed from the laminated structure including the chromium layer and the chromium oxide layer were formed on both surfaces of the soda-lime glass substrate. In this regard, the thickness of the chromium film is 0.02 µm, while the thickness of the chromium oxide film is 0.02 µm.

Next, laser machining was carried out to the mask to form a large number of initial holes within a region of 1.65 m×1.05 m at the central part of the mask. In this regard, the laser machining was carried out using a YAG laser under the conditions of energy intensity of 1 mW, a beam diameter of 3 µm, and a scanning speed of 0.1 m/second. In this way, the initial holes each having a predetermined length were formed in a square lattice pattern over the entire region of the mask mentioned above. The average width between the adjacent two initial holes is 2.0 µm, and the average length of each of the initial holes was 2.1 µm.

In addition, at this time, concave portions each having a depth of about 0.005 µm and a damaged layer (or affected layer) were formed on the surface of the soda-lime glass substrate.

Next, the soda-lime glass substrate was subjected to a wet etching process, thereby forming a large number of concave portions (concave portions for forming microlenses) on the soda-lime glass substrate. The shape of each of the concave portions is a circular shape when viewed from above one major surface of the soda-lime glass substrate. The large number of concave portions thus formed had substantially the same shape as each other. The diameter, radius of curvature and depth of each of the formed concave portions were 100 µm, 60 µm and 48 µm, respectively. Further, the share of the concave portions in a usable area in which the concave portions were formed was 100%.

In this regard, an aqueous solution containing 4% by weight ammonium hydrogen difluoride and 8% by weight hydrogen peroxide was used for the wet etching process as an etchant, and the soak time of the substrate was 2.5 hours.

Next, the mask and back surface protective film were removed by carrying out an etching process using a mixture of ceric ammonium nitrate and perchloric acid. Then, cleaning with pure water and drying with $N_2$ gas (removal of pure water) were carried out.

In this way, the substrate with concave portions in which the large number of concave portions for forming microlenses were arranged in a square lattice manner on the soda-lime glass substrate was obtained. A ratio of an area occupied by all the concave portions in a usable area where the concave portions were formed with respect to the entire usable area was 100% when viewed from above the one major surface of the soda-lime glass substrate.

Next, a mold release agent (GF-6110) was applied to the surface of the substrate with concave portions obtained as described above on which the large number of concave portions were formed, and a non-polymerized (uncured) acrylic based resin was applied to the same surface side of the substrate with concave portions.

Next, the acrylic resin was pressed (pushed) with a flat plate formed of soda-lime glass. At this time, this process was carried out so that air was not intruded between the flat plate and the acrylic resin. In this case, a mold release agent (GF-6110) was applied in advance onto the surface of the flat plate with which the acrylic resin has been in contact when pushing the acrylic based resin.

Then, by irradiating the acrylic resin with ultraviolet rays via the flat plate, the acrylic based resin was cured to obtain a main substrate. The index of refraction of the obtained main substrate (that is, cured resin) was 1.5. The thickness of the obtained main substrate (except for portion where the microlenses were formed) was 2.0 µm. The diameter, radius of curvature and depth of each of the microlenses each having a circular shape were 100 µm, 50 µm and 478 µm, respectively. Further, the share of the concave portions in a usable area in which the concave portions were formed was 100%.

Next, the flat plate and the substrate with concave portions were removed from the main substrate. At this time, it was possible to remove the flat plate, while it was extremely difficult to remove the substrate with concave portions. Although the removal of the substrate with concave portions was attempted sufficiently carefully, defects such as a crack or the like were generated on any formed microlenses.

Next, by forming a colored portion on the surface of the main substrate obtained as described above in the same manner as that in Example 1 described above, a microlens substrate (having a rectangle shape of 1.6 m×1.0 m) was obtained. The color density of the colored portion thus formed was 55%.

Further, by carrying out the same processes as described above using the substrate with concave portions (mold for manufacturing a microlens substrate) repeatedly, total 500 pieces of microlens substrates were manufactured. Then, transmission screens as shown in FIG. 3 were manufactured as well as Example 1 described above using the first microlens substrate and the 500$^{th}$ microlens substrate.

Comparative Example 2

A microlens substrate and a transmission screen were manufactured in the manner similar to those in Comparative Example 1 except that a colored portion was not formed on the main substrate.

A configuration of the mask and the shape of each of the initial holes formed by means of the irradiation with laser beams when manufacturing the mold for manufacturing a microlens substrate, the shape of each of the concave portions and the arrangement pattern of the concave portions in the mold for manufacturing a microlens substrate, the shape of each of the manufactured microlenses, the arrangement pattern of the manufactured microlenses in the manufactured microlens substrate, and the productivity of the microlens substrate (main substrate) and the like in each of Examples 1 to 8 and Comparative Examples 1 and 2 were shown in TABLE 1 as a whole.

TABLE 1

| | | Initial Hole | | | Concave Portion | | | | |
|---|---|---|---|---|---|---|---|---|---|
| | Mask (Surfice Side/ Substrate Side) | Shape | Length (Short Axis) (μm) | Length (Long Axis) (μm) | Shape | Arrangement Pattern | Length (Short Axis) $L_1$ (μm) | Length (Long Axis) $L_2$ (μm) | Depth D (μm) |
| Ex. 1 | Chromium/ Chromium Oxide | Substantially ellipic shape | 2 | 2.1 | Substantially ellipic shape | Houndstooth Check | 54 | 72 | 36.5 |
| Ex. 2 | Chromium/ Chromium Oxide | Substantially Elliptic | 2 | 2 | Substantially Elliptic | Houndstooth Check | 54 | 72 | 36 |
| Ex. 3 | Au/Cr | Substantially Elliptic | 2 | 2.1 | Substantially Elliptic | Houndstooth Check | 54 | 82 | 37 |
| Ex. 4 | Chromium/ Chromium Oxide | Substantially Ellipic | 3 | 3.2 | Substantially Elliptic | Houndstooth Check | 54 | 82 | 37 |
| Ex. 5 | Au/Cr | Substantially Elliptic | 4 | 4.1 | Substantially Elliptic | Houndstooth Check | 60 | 90 | 37 |
| Ex. 6 | Chromium/ Chromium Oxide | Substantially Elliptic | 2 | 2.1 | Substantially Elliptic | Houndstooth Check | 60 | 100 | 37 |
| Ex. 7 | Chromium/ Chromium Oxide | Substantially Circular | 2 | 2 | Circular | Houndstooth Check | 70 | 70 | 37 |
| Ex. 8 | Chromium/ Chromium Oxide | Substantially Circular | 2 | 2 | Substantially Elliptic | Houndstooth Check | 54 | 77 | 37 |
| Co. Ex. 1 | Chromium/ Chromium Oxide | Substantially Elliptic | 2 | 2.1 | Substantially Elliptic | Square Lattice | 54 | 72 | 36.5 |
| Co. Ex. 2 | Chromium/ Chromium Oxide | Substantially Circular | 2 | 2 | Substantially Elliptic | Square Lattice | 54 | 72 | 36 |

| | | Microlens | | | | | |
|---|---|---|---|---|---|---|---|
| | Mask (Surfice Side/ Substrate Side) | Shape | Arrangement Pattern | Length (Short Axis) $L_1$ (μm) | Length (Long Axis) $L_2$ (μm) | Height H (μm) | Productivity of Main Substrate |
| Ex. 1 | Chromium/ Chromium Oxide | Substantially Elliptic | Houndstooth Check | 54 | 72 | 36 | Good |
| Ex. 2 | Chromium/ Chromium Oxide | Substantially Elliptic | Houndstooth Check | 54 | 72 | 35.5 | Good |
| Ex. 3 | Au/Cr | Substantially Elliptic | Houndstooth Check | 54 | 82 | 35.5 | Good |
| Ex. 4 | Chromium/ Chromium Oxide | Substantially Elliptic | Houndstooth Check | 54 | 82 | 34 | Good |
| Ex. 5 | Au/Cr | Substantially Elliptic | Houndstooth Check | 60 | 90 | 37 | Good |
| Ex. 6 | Chromium/ Chromium Oxide | Substantially Elliptic | Houndstooth Check | 60 | 100 | 37 | Good |
| Ex. 7 | Chromium/ Chromium Oxide | Circular | Houndstooth Check | 70 | 70 | 39 | Good |
| Ex. 8 | Chromium/ Chromium Oxide | Substantially Elliptic | Houndstooth Check | 54 | 77 | 36 | Good |

TABLE 1-continued

| | | | | | | | |
|---|---|---|---|---|---|---|---|
| Co. Ex. 1 | Chromium/ Chromium Oxide | Substantially Elliptic | Square Lattice | 54 | 72 | 36 | Good |
| Co. Ex. 2 | Chromium/ Chromium Oxide | Substantially Elliptic | Square Lattice | 54 | 72 | 35.5 | Good |

As seen clearly from TABLE 1, in the invention (that is, Examples 1 to 8), it was possible to manufacture the microlens substrates with high productivity. On the other hand, in Comparative Examples 1 and 2, the productivity of the microlens substrates was extremely low. To explain this evaluation in detail, in the invention, the process to release the main substrate (that is, microlens substrate) from the mold for manufacturing a microlens substrate could be carried out easily and surely. On the other hand, in Comparative Examples 1 and 2, it was difficult to release the main substrate from the substrate with concave portions (that is, mold for manufacturing a microlens substrate), and great force was required for release compared with that in the invention.

<Manufacture of Rear Projection>

A rear projection as shown in FIG. 12 was manufactured (assembled) using the transmission screen manufactured in each of Examples 1to 8 and Comparative Examples 1 and 2 described above.

<Evaluation of Endurance of Mold for Manufacturing Microlens Substrate>

The surface of the mold for manufacturing a microlens substrate on which the concave portions have been formed after manufacturing the 500 pieces of microlens substrates (that is, after carrying out the release of the main substrate 500 times repeatedly) in each of Examples 1 to 8 and Comparative Examples 1 and 2 was observed using a microscope. The state of concavo-convex pattern of the surface of the mold for manufacturing a microlens substrate in each of Examples 1 to 8 and Comparative Examples 1 and 2 described above was evaluated on the basis of the following four-step standard.

A: No crack of the concavo-convex pattern was recognized.

B: Little crack of the concavo-convex pattern was recognized.

C: Crack of the concavo-convex pattern was slightly recognized.

D: Crack of the concavo-convex pattern was remarkably recognized.

<Evaluation of Dot Missing and Unevenness of Brightness>

A sample image was displayed on the transmission screen of the rear projection in each of Examples 1 to 8 and Comparative Examples 1 and 2 described above. The generation status of dot missing and unevenness of brightness in the displayed sample image was evaluated on the basis of the following four-step standard.

A: No dot missing and unevenness of brightness was recognized.

B: Little dot missing and unevenness of brightness was recognized.

C: At least one of dot missing and unevenness of brightness was slightly recognized.

D: At least one of dot missing and unevenness of brightness was remarkably recognized.

<Evaluation of Diffracted Light, Moire and Color Heterogeneity>

A sample image was displayed on the transmission screen of the rear projection in each of Examples 1 to 8 and Comparative Examples 1 and 2 described above. The generation status of diffracted light, moire and color heterogeneity in the displayed sample image was evaluated on the basis of the following four-step standard.

A: No diffracted light, moire and color heterogeneity was recognized.

B: Little diffracted light, moire and color heterogeneity was recognized.

C: At least one of diffracted light, moire and color heterogeneity was slightly recognized.

D: At least one of diffracted light, moire and color heterogeneity was remarkably recognized.

<Evaluation for Contrast>

The evaluation for contrast was carried out with respect to the rear projection of each of Examples 1 to 8 and Comparative Examples 1 and 2 described above.

A ratio LW/LB of front side luminance (white luminance) LW ($cd/m^2$) of white indication when total white light having illuminance of 413 luces entered the transmission screen in the rear projection at a dark room to the increasing amount of front side luminance (black luminance increasing amount) LB ($cd/m^2$) of black indication when a light source was fully turned off at a bright room was calculated as contrast (CNT). In this regard, the black luminance increasing amount is referred to as the increasing amount with respect to luminance of black indication at a dark room. Further, the measurement at the bright room was carried out under the conditions in which the illuminance of outside light was about 185 luces, while the measurement at the dark room was carried out under the conditions in which the illuminance of outside light was about 5 luces.

The contrast indicated by LW/LB in each of Examples 1 to 8 and Comparative Examples 1 and 2 was evaluated on the basis of the following four-step standard.

A: The contrast indicated by LW/LB is 500 or more.

B: The contrast indicated by LW/LB is in the range of 400 to 500.

C: The contrast indicated by LW/LB is in the range of 300 to 400.

D: The contrast indicated by LW/LB is 300 or less.

<Measurement of Angle of View>

The measurement of angles of view in both horizontal and vertical directions was carried out while a sample image was displayed on the transmission screen in the rear projection of each of Examples 1 to 8 and Comparative Examples 1 and 2. The measurement of the angles of view was carried out under the conditions in which the measurement was carried out at intervals of one degree with a gonio photometer. These results of the measurement of angles of view were shown in TABLE 2 as a whole.

TABLE 2

| | Endurance of Mold | Diffracted Light, Dot Missing | Moire, Color Heterogeneity | Contrast | Angle of View (°) Vertical Direction | Horizontal Direction |
|---|---|---|---|---|---|---|
| Ex. 1 | A | A | A | A | 22 | 24 |
|  |  | A | A | A | 22 | 24 |
| Ex. 2 | A | A | A | A | 20 | 23 |
|  |  | A | A | A | 20 | 23 |
| Ex. 3 | A | B | B | A | 20 | 22 |
|  |  | B | B | A | 20 | 21 |
| Ex. 4 | A | A | A | A | 19 | 22 |
|  |  | A | A | A | 19 | 22 |
| Ex. 5 | A | B | B | A | 18 | 22 |
|  |  | B | B | A | 18 | 21 |
| Ex. 6 | A | A | A | A | 16 | 22 |
|  |  | A | A | A | 16 | 22 |
| Ex. 7 | A | A | A | A | 17 | 21 |
|  |  | A | A | A | 17 | 21 |
| Ex. 8 | A | A | A | A | 18 | 21 |
|  |  | A | A | A | 18 | 21 |
| Co. Ex. 1 | D | A | B | A | 18 | 20 |
|  |  | D | D | C | 13 | 13 |
| Co. Ex. 2 | D | B | A | C | 18 | 20 |
|  |  | D | D | C | 13 | 13 |

As seen clearly from TABLE 2, no crack of the concavo-convex pattern was recognized in the molds for manufacturing a microlens substrate according to the invention even after carrying out the manufacture of the microlens substrates (that is, the release of the main substrates) repeatedly. Further, the image having an excellent image quality without dot missing, unevenness of brightness, diffracted light, moire, color heterogeneity and the like was obtained according to the invention. Moreover, the rear projection in each of Examples 1 to 8 according to the invention had excellent contrast and excellent angle of view characteristics. In other words, an excellent image could be displayed on each of the rear projections of the invention stably. In particular, excellent results were obtained even in the transmission screen and the rear projection provided with the microlens substrate that has been manufactured after using the mold for manufacturing a microlens substrate repeatedly.

On the other hand, in each of Comparative Examples 1 and 2, any cracks of the concavo-convex pattern were recognized in the substrate with concave portions (mold for manufacturing a microlens substrate) that has been used for manufacturing the microlens substrates (releasing the main substrates) repeatedly. Further, sufficient results were also not obtained in the transmission screen and the rear projection manufactured using the obtained main substrate (microlens substrate). It was thought that this was because by generating the defects of the concavo-convex pattern such as cracks in the substrate with concave portions, it was impossible to form the microlenses having a desired shape in the manufactured microlens substrate, or the defects of the concavo-convex pattern such as cracks were generated in any microlenses of the microlens substrate when releasing the main substrate from the substrate with concave portions.

Finally, microlens substrates, transmission screens and rear projections were manufactured in the manner similar to those in Examples 1 to 8 and Comparative Examples 1 and 2 except that the method such as a thermal press transferring method (including extrusion molding) in which the mold was pressed onto softened resin by heating and cooled off, a casting polymerizing method in which monomer resin was polymerized and hardened, a 2P method in which resin was cured by light was utilized. Then, similar evaluations described above were carried out, whereby the similar results described above were obtained.

What is claimed is:

1. A mold for manufacturing a microlens substrate provided with a plurality of microlenses each having a predetermined substantially elliptic convex shape, the mold being used to press a base material of the microlens substrate to form the plurality of microlenses thereon,
    wherein the mold has a roll shape having an outer peripheral surface, and a plurality of concave portions each having a substantially elliptic shape corresponding to the convex shape of each microlens being provided on the outer peripheral surface of the mold for pressing the base material of the microlens substrate, and the plurality of concave portions being formed by an etching process with a mask,
    the plurality of concave portions arranged on the outer peripheral surface of the mold for manufacturing the microlens substrate in a houndstooth check manner, and
    wherein the microlens substrate manufactured using the mold has a usable area where the plurality of microlenses are formed and an area occupied by the plurality of microlenses in the usable area,
    wherein the plurality of concave portions are arranged on the outer peripheral surface of the mold so that a ratio of the area with respect to the entire usable area is in the range of 97 to 99.5% when the microlens substrate is manufactured using the mold.

2. The mold as claimed in claim 1, wherein the mask has a laminated structure constructed from a layer formed of chromium as a main material and a layer formed of chromium oxide as a main material.

3. The mold as claimed in claim 1, wherein each of the plurality of concave portions has a substantially elliptic shape.

4. The mold as claimed in claim 3, wherein the length of each of the plurality of concave portions in a long axis direction thereof is in the range of 15 to 750 μm.

5. The mold as claimed in claim 3, wherein the length of each of the plurality of concave portions in a short axis direction thereof is in the range of 10 to 500 μm.

6. The mold as claimed in claim 1, wherein the depth of each of the plurality of concave portions is in the range of 5 to 250 μm.

7. The mold as claimed in claim 1, wherein the mold is manufactured from a roll-shaped base having an axis of rotation, and the etching process is carried out while the roll-shaped base onto which the mask has been applied is rotated around the axis of rotation thereof.

8. A method for manufacturing the mold as recited in claim 1, the method comprising:
preparing a roll-shaped base material having an outer peripheral surface for manufacturing the mold;
forming a mask on the outer peripheral surface of the prepared base material, the mask having a laminated structure constructed from a layer formed of chromium as a main material and a layer formed of chromium oxide as a main material;
forming a plurality of initial holes each having an elliptic shape in the mask in a houndstooth check manner;
forming the plurality of concave portions in the base material in the houndstooth check manner by subjecting the base material to an etching process using the mask in which the initial holes are formed; and
removing the mask from the surface of the base material to obtain the mold.

9. The method as claimed in claim 8, wherein the forming the plurality of initial holes is carried out so that the surface of the base material is partially removed to form initial concave portions corresponding to the respective initial holes.

10. The method as claimed in claim 8, wherein the base material comprises a glass material, the etching process is carried out by a wet etching process using an etchant, and the etchant contains ammonium hydrogen difluoride and hydrogen peroxide.

* * * * *